United States Patent
Yoshikawa et al.

(10) Patent No.: US 10,323,716 B2
(45) Date of Patent: Jun. 18, 2019

(54) DAMPER DEVICE

(71) Applicants: AISIN AW INDUSTRIES CO., LTD, Echizen-shi, Fukui (JP); AISIN AW CO., LTD., Anjo-shi, Aichi (JP)

(72) Inventors: Takuya Yoshikawa, Echizen (JP); Aki Ogawa, Echizen (JP); Tomonori Kinoshita, Echizen (JP); Yuji Kanyama, Echizen (JP); Makoto Yamaguchi, Echizen (JP); Kazuyoshi Ito, Anjo (JP); Hiroki Nagai, Anjo (JP); Masaki Wajima, Anjo (JP); Takao Sakamoto, Anjo (JP); Kazuhiro Itou, Anjo (JP); Yoshihiro Takikawa, Anjo (JP); Yoichi Oi, Anjo (JP)

(73) Assignees: AISIN AW CO., LTD., Anjo (JP); AISIN AW INDUSTRIES CO., LTD, Echizen-shi (JP)

( * ) Notice: Subject to any disclaimer, the term of this patent is extended or adjusted under 35 U.S.C. 154(b) by 65 days.

(21) Appl. No.: 15/532,012

(22) PCT Filed: Dec. 25, 2015

(86) PCT No.: PCT/JP2015/086404
§ 371 (c)(1),
(2) Date: May 31, 2017

(87) PCT Pub. No.: WO2016/104783
PCT Pub. Date: Jun. 30, 2016

(65) Prior Publication Data
US 2017/0261065 A1    Sep. 14, 2017

(30) Foreign Application Priority Data
Dec. 25, 2014 (JP) .................................. 2014-263006

(51) Int. Cl.
*F16H 45/02* (2006.01)
*F16F 15/14* (2006.01)
(Continued)

(52) U.S. Cl.
CPC ............ *F16F 15/1478* (2013.01); *F16D 3/12* (2013.01); *F16F 15/12306* (2013.01);
(Continued)

(58) Field of Classification Search
CPC ............ F16F 15/1478; F16F 15/12306; F16F 15/12366; F16F 15/12353; F16F 228/001;
(Continued)

(56) References Cited

U.S. PATENT DOCUMENTS 5,863,274 A * 1/1999 Jackel ............... F16F 15/13157
192/70.17
6,126,568 A 10/2000 Sudau
(Continued)

FOREIGN PATENT DOCUMENTS

JP    3299510 B2    7/2002
JP    3476719 B2    12/2003
(Continued)

OTHER PUBLICATIONS

Apr. 5, 2016 International Search Report issued in International Patent Application No. PCT/JP2015/086404.

*Primary Examiner* — David J Hlavka
(74) *Attorney, Agent, or Firm* — Oliff PLC

(57) ABSTRACT

A damper device includes first inner springs configured to transmit a torque between a drive member and an intermediate member, second inner springs configured to transmit a torque between the intermediate member and a driven member, and a rotary inertia mass damper including a sun gear serving as a mass body rotating with relative rotation of the drive member to the driven member. The rotary inertia
(Continued)

mass damper is provided in parallel to a torque transmission path including the intermediate member, the first inner springs and the second inner springs. A damping ratio $\zeta$ of the intermediate member determined based on a moment of inertia $J_2$ of the intermediate member and rigidities $k_1$ and $k_2$ of the first and the second inner springs and is less than a value.

20 Claims, 11 Drawing Sheets

(51) Int. Cl.
*F16D 3/12* (2006.01)
*F16F 15/123* (2006.01)

(52) U.S. Cl.
CPC .. *F16F 15/12353* (2013.01); *F16F 15/12366* (2013.01); *F16F 2228/001* (2013.01); *F16F 2232/02* (2013.01); *F16H 45/02* (2013.01); *F16H 2045/0231* (2013.01); *F16H 2045/0268* (2013.01)

(58) Field of Classification Search
CPC ............... F16F 2232/02; F16D 3/12; F16H 2045/0268; F16H 2045/0231; F16H 45/02
See application file for complete search history.

(56) References Cited

U.S. PATENT DOCUMENTS

| | | | |
|---|---|---|---|
| 6,231,472 B1 | 5/2001 | Sudau et al. | |
| 9,267,569 B2 * | 2/2016 | Franke | F16F 15/1206 |
| 9,556,944 B2 * | 1/2017 | Sekiguchi | F16H 45/02 |
| 10,006,517 B2 * | 6/2018 | Li | F16F 15/1206 |
| 2012/0208647 A1 | 8/2012 | Takikawa et al. | |
| 2017/0198795 A1 * | 7/2017 | Tsuji | F16H 45/02 |
| 2018/0223948 A1 * | 8/2018 | Takikawa | F16F 15/1205 |

FOREIGN PATENT DOCUMENTS

| | | |
|---|---|---|
| JP | 2008-164013 A | 7/2008 |
| JP | 2011-214635 A | 10/2011 |
| JP | 2012-167755 A | 9/2012 |
| JP | 5169725 B2 | 3/2013 |
| JP | 2014-177959 A | 9/2014 |
| WO | 2014-117978 A1 | 8/2014 |

* cited by examiner

FIG.11
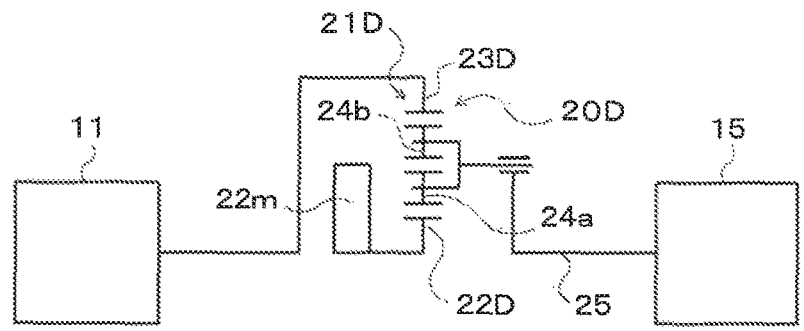
FIG. 11A
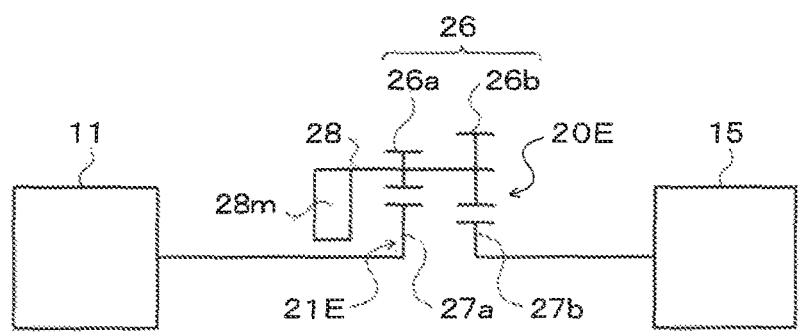
FIG. 11B
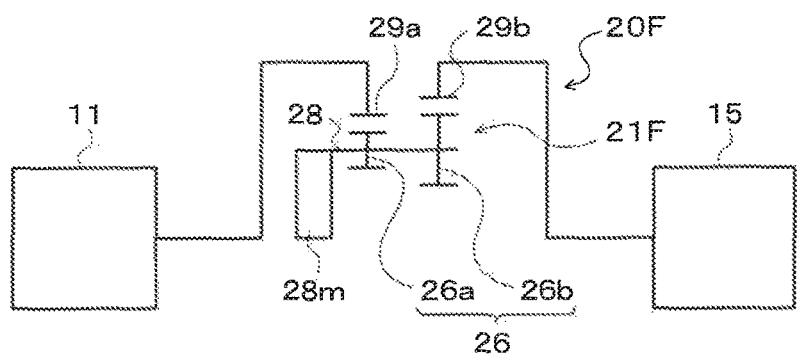
FIG. 11C
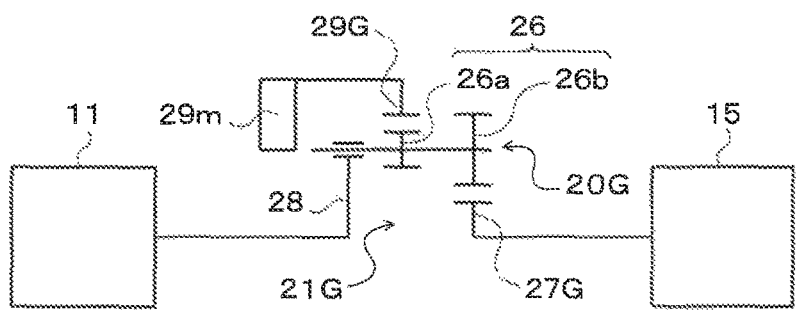
FIG. 11D

DAMPER DEVICE

This is a national phase application of PCT/JP2015/086404 filed Dec. 25, 2015, claiming priority to Japanese Patent Application No. JP2014-263006 filed Dec. 25, 2014, the contents of which are incorporated herein by reference.

TECHNICAL FIELD

The present disclosure relates to a damper device including an input element, an output element and an elastic body configured to transmit a torque between the input element and the output element.

BACKGROUND

A conventionally known configuration of a torsional vibration damper includes a damper spring device including a plurality of springs arrayed in a circumferential direction, and a rotary inertia mass damper (as shown in, for example, Patent Literature 1). In this torsional vibration damper, the damper spring device includes a plurality of sliding blocks that are respectively placed between adjacent springs and arranged such that an entire outer circumferential surface is supported by a drive-side damper element (input element) to be slidable. The rotary inertia mass damper includes the driven-side damper element arranged to rotate integrally with a turbine shell of a turbine wheel and configured to include a sun gear of a planetary gear; a driven-side damper element (output element) arranged to rotate integrally with a turbine hub of the turbine wheel and configured to serve as a carrier of the planetary gear; a pinion gear rotatably supported by the driven-side damper element and arranged to engage with the sun gear; and a ring gear configured to serve as a mass body engaging with the pinion gear. In the torsional vibration damper of this configuration, when the driven-side damper element is rotated (twisted) relative to the driven-side damper element, the springs of the damper spring device are deflected, and the ring gear as the mass body is rotated with relative rotation of the drive-side damper element to the driven-side damper element. This configuration causes a torque according to an inertia (moment of inertia) of the ring gear as the mass body and a difference in angular acceleration between the drive-side damper element and the driven-side damper element to be applied to the driven-side damper element and improves the vibration damping performance of the torsional vibration damper.

CITATION LIST

Patent Literature

PTL1: Japanese Patent No. 3476719 (FIGS. 5 and 7)

SUMMARY

When a vibration transmitted to the drive-side damper element (input element) has a fixed amplitude, the torque applied from the rotary inertia mass damper to the driven-side damper element (output element) is gradually increased with an increase in frequency of the vibration (rotation speed of the drive-side damper element). As shown in FIG. 2 of Patent Literature 1, on the other hand, the amplitude of a vibration transmitted from the damper spring device to the output element is decreased with an increase in rotation speed (frequency) of the drive-side damper element, especially in a higher rotation speed range (higher frequency range) than a rotation speed corresponding to a natural frequency EF4. Accordingly, in the prior art torsional vibration damper, a large torque is applied from the rotary inertia mass damper to the output element in the state that the amplitude of the vibration transmitted from the damper spring device to the output element is lowered. This is likely to rather reduce the vibration damping performance.

A main object of the disclosure is to provide a damper device having better vibration damping performance.

The present disclosure is directed to a damper device. The damper device configured to include an input element to which a torque from an engine is transmitted and an output element, the damper device includes a torque transmission path including an intermediate element, a first elastic body configured to transmit a torque between the input element and the intermediate element, and a second elastic body configured to transmit a torque between the intermediate element and the output element, and a rotary inertia mass damper configured to include a mass body rotating with relative rotation of the input element to the output element and provided between the input element and the output element in parallel to the torque transmission path. A damping ratio of the intermediate element determined based on a moment of inertia of the intermediate element and rigidities of the first and the second elastic bodies is less than a value 1.

In the damper device of this aspect, on the assumption that an input torque transmitted to the input element is periodically vibrated, the phase of a vibration transmitted from the input element to the output element via the torque transmission path is shifted by 180 degrees from the phase of a vibration transmitted from the input element to the output element via the rotary inertia mass damper. A plurality of natural frequencies (resonance frequencies) may be set in the torque transmission path including the intermediate element having the damping ratio of less than the value 1, in the state that deflections of the first and the second elastic bodies are allowed. A resonance of the intermediate element may be caused in this torque transmission path when the rotation speed of the input element reaches a rotation speed corresponding to one of the plurality of natural frequencies. This configuration enables two antiresonance points, where the vibration transmitted from the input element to the output element via the torque transmission path and the vibration transmitted from the input element to the output element via the rotary inertia mass damper are theoretically cancelled out each other, to be set in the damper device of this aspect. This configuration thus remarkably effectively improves the vibration damping performance of the damper device by making the frequencies of the two antiresonance points equal to (closer to) the frequency of the vibration (resonance) to be damped by the damper device. Additionally, in the damper device of this aspect, a resonance of the intermediate element occurs when the rotation speed of the input element becomes higher than a rotation speed corresponding to the frequency of an antiresonance point of the lower rotation speed (lower frequency). The amplitude of the vibration transmitted from the second elastic body to the output element accordingly changes from decreasing to increasing before the rotation speed of the input element reaches a rotation speed corresponding to a relatively lower natural frequency of the intermediate element. Even when the amplitude of the vibration transmitted from the rotary inertia mass damper to the output element is gradually increased with an increase in rotation speed of the input element, this expands an area where the vibration transmitted from the rotary inertia mass damper to the output element cancels out at least part of the vibration transmitted from the second elastic body to the output element. This results in further improving the vibration damping performance of the damper device in a relatively low rotation speed range of the input element.

BRIEF DESCRIPTION OF DRAWINGS

FIGS. 11A, 11B, 11C and 11D are schematic diagrams illustrating other rotary inertia mass dampers applicable to the damper devices of FIG. 1 and other drawings.

DESCRIPTION OF EMBODIMENTS

The following describes some embodiments of the present disclosure with reference to drawings.

Figure 1:
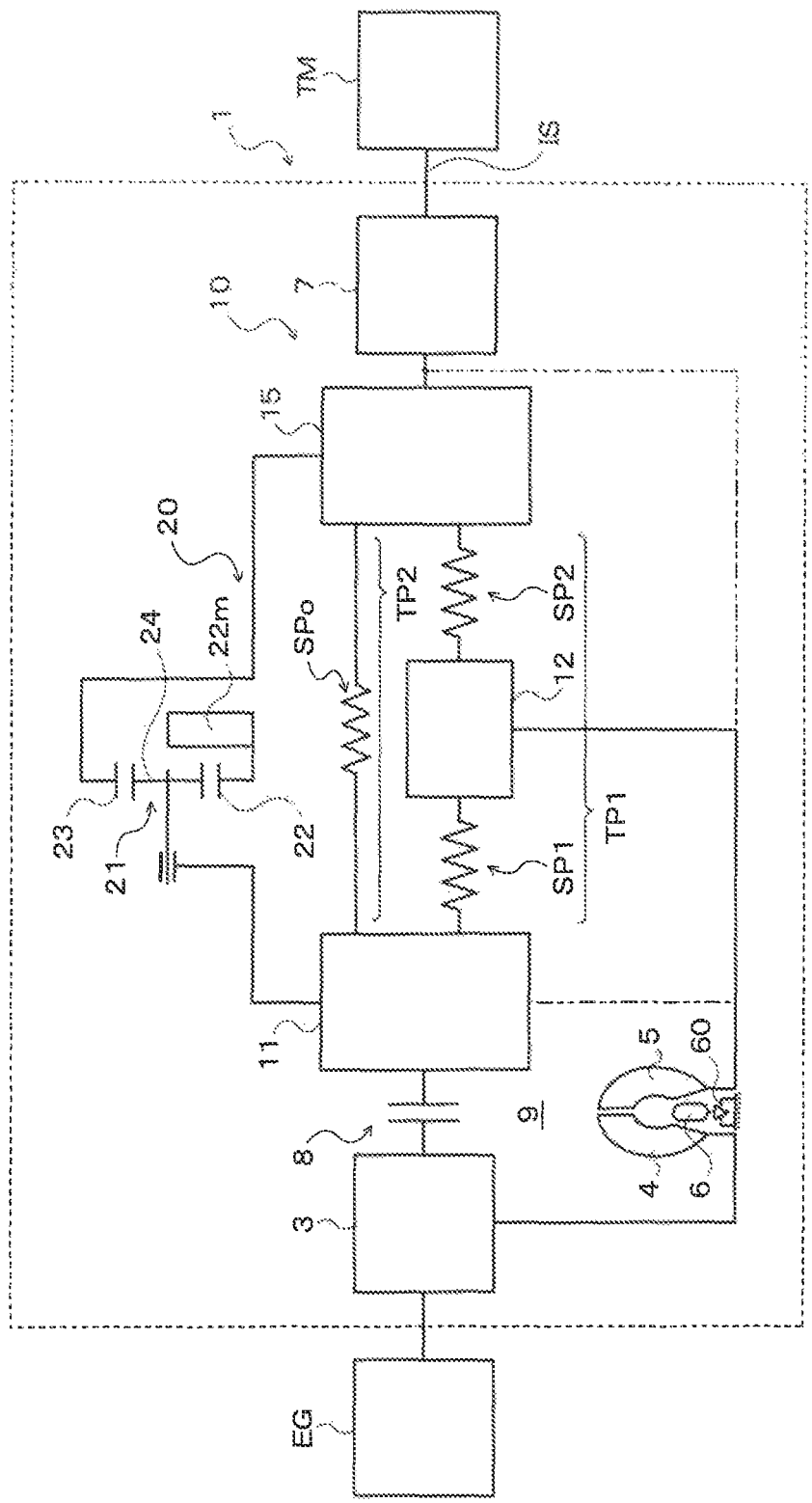
FIG. 1 is a schematic configuration diagram illustrating a starting device including a damper device according to one embodiment of the disclosure.
Figure 2:
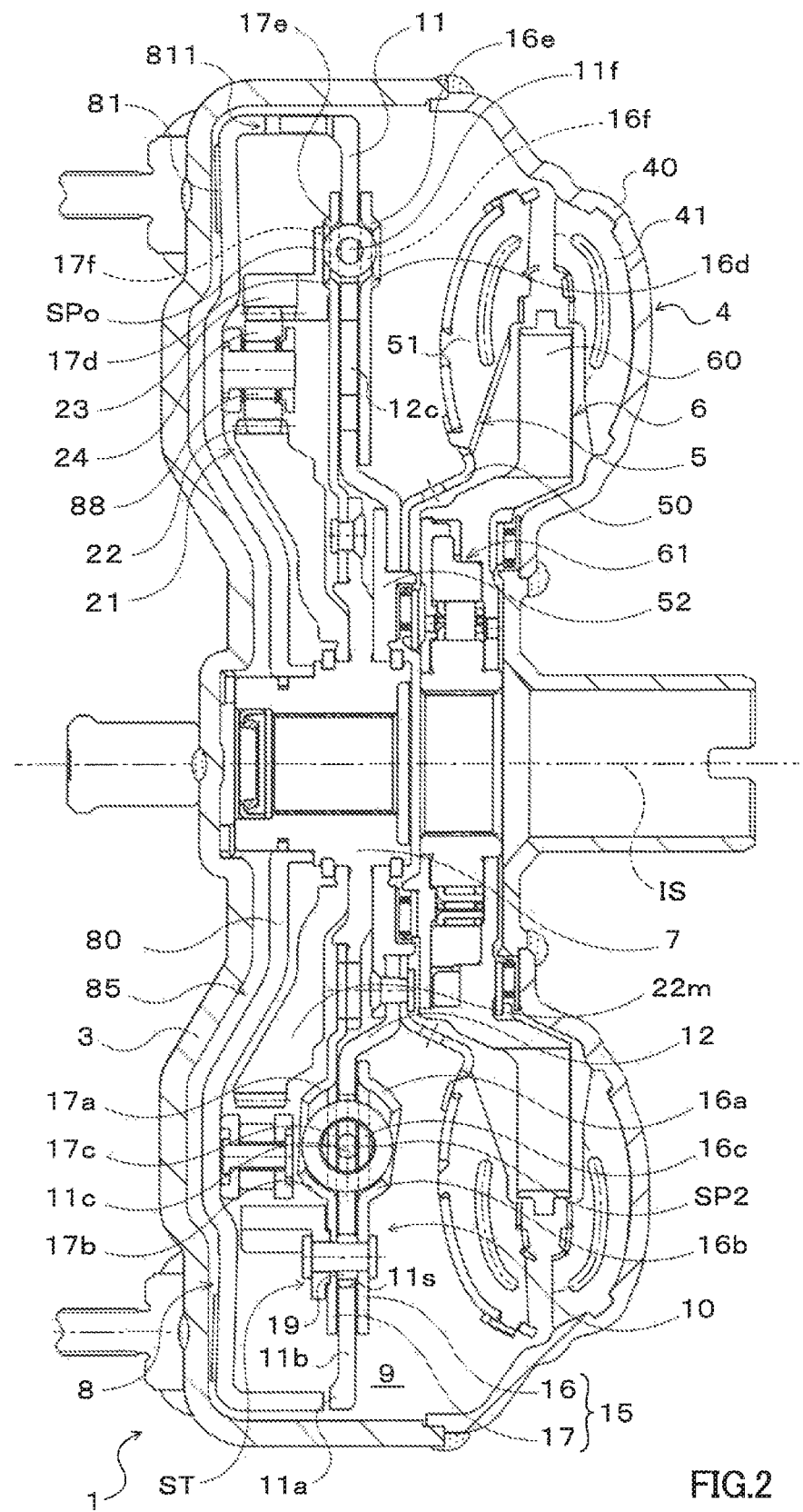
FIG. 2 is a sectional view illustrating the starting device of FIG. 1.

FIG. 1 is a schematic configuration diagram illustrating a starting device 1 including a damper device 10 according to one embodiment of the disclosure. FIG. 2 is a sectional view illustrating the starting device 1. The starting device 1 illustrated in these drawings is mounted on a vehicle equipped with an engine (internal combustion engine) EG as the prime mover and may include, in addition to the damper device 10, for example, a front cover 3 serving as an input member connected with a crankshaft of the engine EG and configured to receive a torque transmitted from the engine EG, a pump impeller (input-side fluid transmission element) 4 fixed to the front cover 3, a turbine runner (output-side fluid transmission element) 5 arranged to be rotatable coaxially with the pump impeller 4, a damper hub 7 serving as an input member connected with the damper device 10 and fixed to an input shaft IS of a transmission TM that is either an automatic transmission (AT) or a continuously variable transmission (CVT), and a lockup clutch 8.

In the description below, a term "axial direction" basically means an extending direction of a central axis (axial center) of the starting device 1 or the damper device 10, unless otherwise specified. A term "radial direction" basically means a radial direction of the starting device 1, the damper device 10 or a rotational element of the damper device 10 and so on, i.e., an extending direction of a straight line extended in a direction perpendicular to the central axis (radial direction) from the central axis of the starting device 1 or the damper device 10, unless otherwise specified. Additionally, a term "circumferential direction" basically means a circumferential direction of the starting device 1, the damper device 10 or a rotational element of the damper device and so on, i.e., a direction along a rotation direction of the rotational element, unless otherwise specified.

As shown in FIG. 2, the pump impeller 4 includes a pump shell 40 closely fixed to the front cover 3 and a plurality of pump blades 41 provided on an inner surface of the pump shell 40. As shown in FIG. 2, the turbine runner 5 includes a turbine shell 50 and a plurality of turbine blades 51 provided on an inner surface of the turbine shell 50. An inner circumferential portion of the turbine shell 50 is fixed to the turbine hub 52 by means of a plurality of rivets. The turbine hub 52 is rotatably supported by the damper hub 7. The motion of the turbine hub 52 (turbine runner 5) in the axial direction of the starting device 1 is restricted by the damper hub 7 and a snap ring mounted to the damper hub 7.

The pump impeller 4 and the turbine runner 5 are opposed to each other, and a stator 6 is placed coaxially between the pump impeller 4 and the turbine runner 5 to straighten the flow of hydraulic oil (working fluid) from the turbine runner 5 to the pump impeller 4. The stator 6 includes a plurality of stator blades 60. The rotation direction of the stator 6 is set to only one direction by a one-way clutch 61. The pump impeller 4, the turbine runner 5 and the stator 6 form a torus (annular passage) to circulate the hydraulic oil and serves as a torque converter (fluid transmission device) having the torque amplification function. In the starting device 1, however, the stator 6 and the one-way clutch 61 may be omitted, and the pump impeller 4 and the turbine runner 5 may serve as fluid coupling.

The lockup clutch 8 is configured to engage lockup that couples the front cover 3 with the damper hub 7 via the damper device 10 and to release the lockup. According to this embodiment, the lockup clutch 8 is configured as a single-disc hydraulic clutch and includes a lockup piston 80 that is arranged inside of the front cover 3 and close to an engine EG-side inner wall surface of the front cover 3 and that is fit in the damper hub 7 to be rotatable and movable in the axial direction. As shown in FIG. 2, friction members 81 are applied on an outer circumferential-side and front cover 3-side surface of the lockup piston 80. A lockup chamber 85 is defined between the lockup piston 80 and the front cover 3 to be connected with a non-illustrated hydraulic control device via a hydraulic oil supply passage and an oil passage formed in the input shaft IS.

The hydraulic oil from the hydraulic control device supplied radially outward from the axial center side of the pump impeller 4 and the turbine runner 5 (periphery of the one-way clutch 61) through, for example, the oil passage formed in the input shaft IS to the pump impeller 4 and the turbine runner (torus) is allowed to flow into the lockup chamber 85. Accordingly, when the internal pressure of the lockup chamber 85 is maintained equal to the internal pressure of a fluid transmission chamber 9 defined by the front cover 3 and the pump shell of the pump impeller 4, the lockup piston 80 does not move toward the front cover 3 and is not frictionally engaged with the front cover 3. When the internal pressure of the lockup chamber 85 is reduced by the non-illustrated hydraulic control device, on the other hand, the pressure difference causes the lockup piston 80 to move toward the front cover 3 and to be frictionally engaged with the front cover 3. The front cover 3 is accordingly coupled with the damper hub 7 via the damper device 10. A multi-disc hydraulic clutch including at least one frictional engagement plate (a plurality of friction members) may be employed for the lockup clutch 8.

As shown in FIGS. 1 and 2, the damper device 10 includes a drive member (input element) 11, an intermediate member (intermediate element) 12 and a driven member (output element) 15, as rotational elements. The damper device 10 also includes a plurality of (for example, three according to this embodiment) first inner springs (first elastic bodies) SP1 configured to transmit the toque between the drive member 11 and the intermediate member 12, a plurality of (for example, three according to this embodiment) second inner springs (second elastic bodies) SP2 configured to respectively work in series with the corresponding first inner springs SP1 and to transmit the torque between the intermediate member 12 and the driven member 15, and a plurality of (for example, three according to this embodiment) outer springs SPo configured to transmit the torque between the drive member 11 and the driven member 15, as torque transmission elements (torque transmission elastic bodies).

As shown in FIG. 1, the damper device 10 accordingly has a first torque transmission path TP1 and a second torque transmission path TP2 that are provided parallel to each other between the drive member 11 and the driven member 15. The first torque transmission path TP1 is formed from the plurality of first inner springs SP1, the intermediate member 12 and the plurality of second inner springs SP2 and is configured to transmit the torque between the drive member 11 and the driven member 15 via these elements. The second torque transmission path TP2 is formed from the plurality of outer springs SPo and is configured to transmit the torque between the drive member 11 and the driven member 15 via the plurality of outer springs SPo that work parallel to one another.

According to this embodiment, coil springs having an identical specification (spring constant) are employed for the first and the second inner springs SP1 and SP2. Additionally, the plurality of outer springs SPo forming the second torque transmission path TP2 are configured to work in parallel to the first and the second inner springs SP1 and SP2 forming the first torque transmission path TP1, after the input torque into the drive member 11 reaches a predetermined torque (first threshold value) T1 that is smaller than a torque T2 (second threshold value) corresponding to a maximum torsion angle θmax of the damper device 10 and the torsion angle of the drive member 11 relative to the driven member 15 becomes equal to or larger than a predetermined angle θref. The damper device 10 accordingly has two-step (two-stage) damping characteristics.

According to this embodiment, a linear coil spring formed from a metal material that is spirally wound to have a axial center extended linearly without application of a load is employed for the first and the second inner springs SP1 and SP2 and the outer springs SPo. Compared with employing an arc coil spring, this more appropriately expands and contracts the first and the second inner springs SP1 and SP2 and the outer springs SPo along their axial centers and reduces a hysteresis H (difference between a torque output from the driven member 15 in response to an increase of the input torque into the drive member 11 and a torque output from the driven member 15 in response to a decrease of this input torque). The arc coil spring may, however, be employed for at least any of the first and the second inner springs SP1 and SP2 and the outer springs SPo.

As shown in FIG. 2, the drive member 11 of the damper device 10 includes a short outer cylinder portion 11*a* and a plate-like annular 11*b* extended radially inward from one end of the outer cylinder portion 11*a*. The outer cylinder portion 11*a* of the drive member 11 is coupled with an outer circumferential portion of the lockup piston 80 of the lockup clutch 8 via an interlocking engagement portion 811. This configuration causes the drive member 11 to be rotatable integrally with the lockup piston 80. The front cover 3 is coupled with the drive member 11 of the damper device 10 by engagement of the lockup clutch 8.

Figure 3:
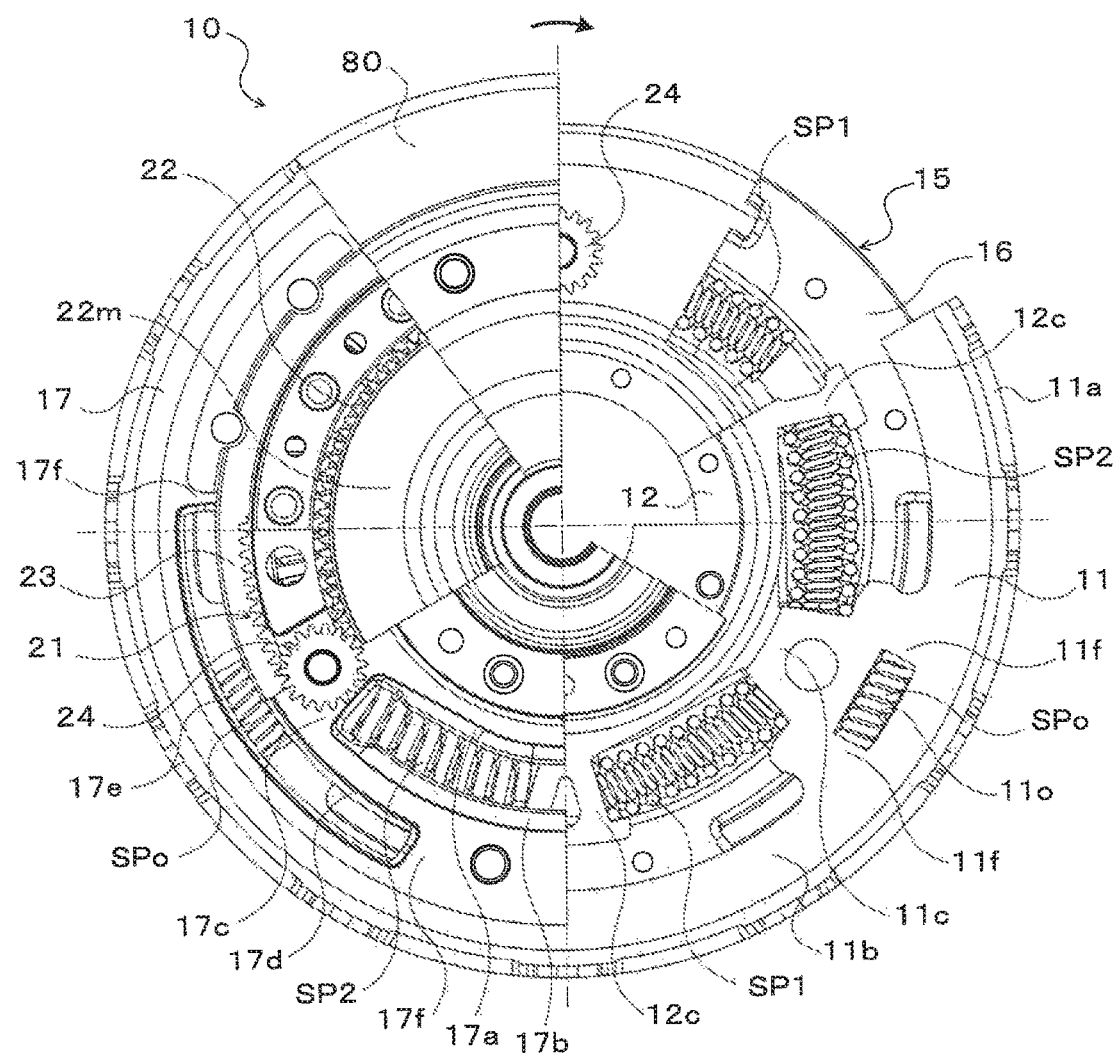
FIG. 3 is a front view illustrating the damper device of FIGS. 1 and 2.

As shown in FIG. 3, the drive member 11 includes a plurality of (for example, three at intervals of 120 degrees according to this embodiment) inner spring abutting portions 11*c* that are protruded radially inward (toward the axial center of the drive member 11) from an inner circumferential surface of the annular portion 11*b* and are arranged at intervals in the circumferential direction. Additionally, as shown in FIG. 3, a plurality of (for example, three at intervals of 120 degrees according to this embodiment) outer spring receiving portions 11*o* are formed in the annular portion 11*b* to be respectively located on the outer side in the radial direction of the corresponding inner spring abutting portions 11*c* and to be arranged at intervals in the circumferential direction. Each of the outer spring receiving portions 11*o* has a circumferential length according to the natural length of the outer spring SPo, and one outer spring abutting portion 11*f* is formed on each side in the circumferential direction of each outer spring receiving portion 11*o*.

The intermediate member 12 is a plate-like annular member and includes a plurality of (for example, three at intervals of 120 degrees according to this embodiment) spring abutting portions 12*c* that are protruded radially outward from its outer circumferential surface and are arranged at intervals in the circumferential direction. As shown in FIG. 2, an inner circumferential portion of the intermediate member 12, along with an inner circumferential portion of the turbine shell 50, is fixed to the turbine hub 52 by means of a plurality of rivets. This configuration couples the intermediate member 12 and the turbine runner 5 with each other to be integrally rotated. Coupling of the turbine runner 5 (and the turbine hub 52) with the intermediate member 12 allows for a further increase of the substantial moment of inertia of the intermediate member 12 (total moment of inertia of the intermediate member 12, the turbine runner 5 and the like).

The driven member 15 includes an annular first output plate member 16 that is arranged on the turbine runner 5-side, and an annular second output plate member 17 that is arranged on the front cover 3-side and is coupled with (fixed to) the first output plate member 16 by means of a plurality of rivets. The first output plate member 16 of the driven member 15 includes a plurality of (for example, three at intervals of 120 degrees according to this embodiment) arc-shaped spring support portions 16*a* that are arranged along its inner circumferential edge at intervals in the circumferential direction; a plurality of (for example, three at intervals of 120 degrees according to this embodiment) arc-shaped spring support portions 16*b* that are located on the outer side in the radial direction of the plurality of spring support portions 16*a*, are arranged at intervals in the circumferential direction and are respectively opposed to the corresponding spring support portions 16*a* in the radial direction of the first output plate member 16; and a plurality of (for example, three according to this embodiment) inner spring abutting portions 16c. Each of the plurality of inner spring abutting portions 16c is provided between each pair of the spring support portions 16a and 16b arranged adjacent to each other in the circumferential direction.

Additionally, the first output plate member 16 includes a plurality of (for example, three at intervals of 120 degrees according to this embodiment) arc-shaped spring support portions 16d that are located on the outer side in the radial direction of the spring support portions 16b and are arranged at intervals in the circumferential direction; and a plurality of (for example, three at intervals of 120 degrees according to this embodiment) arc-shaped spring support portions 16e that are located on the outer side in the radial direction of the plurality of spring support portions 16d, are arranged at intervals in the circumferential direction and are respectively opposed to the corresponding spring support portions 16d in the radial direction of the first output plate member 16. A central region of each pair of the spring support portions 16d and 16e is located on the outer side in the radial direction of the corresponding inner spring abutting portion 16c. Each pair of the spring support portions 16d and 16e are arranged to overlap in the radial direction with both an adjacent pair of the spring support portions 16b. One outer spring abutting portion 16f is formed on each side of the pair of spring support portions 16d and 16e.

As shown in FIG. 2, an inner circumferential portion of the second output plate member 17 included in the driven member is fixed to the damper hub 7 by means of a plurality of rivets. The second output plate members 17 includes a plurality of (for example, three at intervals of 120 degrees according to this embodiment) arc-shaped spring receiving portions 17a that are arranged along its inner circumferential edge at intervals in the circumferential direction; a plurality of (for example, three at intervals of 120 degrees according to this embodiment) arc-shaped spring support portions 17b that are located on the outer side in the radial direction of the plurality of spring support portions 17a, are arranged at intervals in the circumferential direction and are respectively opposed to the corresponding spring support portions 17a in the radial direction of the second output plate member 17; and a plurality of (for example, three according to this embodiment) inner spring abutting portions 17c. Each of the plurality of inner spring abutting portions 17c is provided between each pair of the spring support portions 17a and 17b arranged adjacent to each other in the circumferential direction.

Additionally, the second output plate member 17 includes a plurality of (for example, three at intervals of 120 degrees according to this embodiment) arc-shaped spring support portions 17d that are located on the outer side in the radial direction of the spring support portions 17b and are arranged at intervals in the circumferential direction; and a plurality of (for example, three at intervals of 120 degrees according to this embodiment) arc-shaped spring support portions 17e that are located on the outer side in the radial direction of the plurality of spring support portions 17d, are arranged at intervals in the circumferential direction and are respectively opposed to the corresponding spring support portions 17d in the radial direction of the second output plate member 17. A central region of each pair of the spring support portions 17d and 17e is located on the outer side in the radial direction of the corresponding inner spring abutting portion 17c. Each pair of the spring support portions 17d and 17e are arranged to overlap in the radial direction with both an adjacent pair of the spring support portions 17b. One outer spring abutting portion 17f is formed on each side of the pair of spring support portions 17d and 17e.

In the state that the first output plate member 16 and the second output plate member 17 are coupled with each other, the plurality of spring support portions 16a of the first output plate member 16 serve to respectively support (guide), from the inner circumferential side, turbine runner 5-side lateral portions of the corresponding first and second inner springs SP1 and SP2. The plurality of spring support portions 16b serve to respectively support (guide), from the outer circumferential side, the turbine runner 5-side lateral portions of the corresponding first and second inner springs SP1 and SP2. The plurality of spring support portions 17a of the second output plate member 17 are opposed in the axial direction to the corresponding spring support portions 16a of the first output plate member 16 and serve to respectively support (guide), from the inner circumferential side, lockup piston 80-side lateral portions of the corresponding first and second inner springs SP1 and SP2. The plurality of spring support portions 17b are opposed in the axial direction to the corresponding spring support portions 16b of the first output plate member 16 and serve to respectively support (guide), from the outer circumferential side, the lockup piston 80-side lateral portions of the corresponding first and second inner springs SP1 and SP2.

The first and the second inner springs SP1 and SP2 are accordingly supported by the spring support portions 16a and 16b of the first output plate member 16 and the spring support portions 17a and 17b of the second output plate member 17, such that one first inner spring SP1 and one second inner spring SP2 form a pair (to act in series) and that the first inner springs SP1 and the second inner springs SP2 are alternately arranged in the circumferential direction of the driven member 15. According to this embodiment, as shown in FIG. 3, the plurality of first inner springs SP1 and the plurality of second inner springs SP2 are arranged on an identical circumference, such that the distance between the axial center of the starting device 1 or the damper device 10 and the axial center of each first inner spring SP1 is equal to the distance between the axial center of the starting device 1 and so on and the axial center of each second inner spring SP2.

In the mounting state of the damper device 10, each inner spring abutting portion 11c of the drive member 11 is placed between the first inner spring SP1 and the second inner spring SP2 to abut on respective one ends the first inner spring SP1 and the second inner spring SP2 that are respectively supported by the different spring support portions 16a, 16b, 17a and 17b and do not form a pair (not to act in series). Each spring abutting portion 12c of the intermediate member 12 is placed between the first inner spring SP1 and the second inner spring SP2 to abut on respective one ends the first inner spring SP1 and the second inner spring SP2 that are supported by the same spring support portions 16a, 16b, 17a and 17b and form a pair. Each inner spring abutting portion 16c of the first output plate member 16 is placed between the first inner spring SP1 and the second inner spring SP2 to abut on respective one ends the first inner spring SP1 and the second inner spring SP2 that are respectively supported by the different spring support portions 16a, 16b, 17a and 17b and do not form a pair (not to act in series). Similarly each inner spring abutting portion 17c of the second output plate member 17 is placed between the first inner spring SP1 and the second inner spring SP2 to abut on respective one ends the first inner spring SP1 and the second inner spring SP2 that are respectively supported by the different spring support portions 16a, 16b, 17a and 17b and do not form a pair (not to act in series).

In the mounting state of the damper device 10, one end of each first inner spring SP1 abuts on a corresponding inner spring abutting portion 11c of the drive member 11, and the other end of each first inner spring SP1 abuts on a corresponding spring abutting portion 12c of the intermediate member 12. One end of each second inner spring SP2 abuts on a corresponding spring abutting portion 12c of the intermediate member 12, and the other end of each second inner spring SP2 abuts on corresponding inner spring abutting portions 16c and 17c of the driven member 15. As a result, each pair of the first and the second inner springs SP1 and SP2 are coupled with each other in series via the spring abutting portion 12c of the intermediate member 12 between the drive member 11 and the driven member 15. Accordingly this configuration of the damper device 10 further reduces the rigidity of the elastic bodies configured to transmit the torque between the drive member 11 and the driven member 15 or more specifically a combined spring constant of the first and the second inner springs SP1 and SP2.

In the state that the first output plate member 16 and the second output plate member 17 are coupled with each other, the plurality of spring support portions 16d of the first output plate member 16 serve to respectively support (guide), from the inner circumferential side, turbine runner 5-side lateral portions of the corresponding outer springs SPo. The plurality of spring support portions 16e serve to respectively support (guide), from the outer circumferential side, the turbine runner 5-side lateral portions of the corresponding outer springs SPo. The plurality of spring support portions 17d of the second output plate member 17 are opposed in the axial direction to the corresponding spring support portions 16d of the first output plate member 16 and serve to respectively support (guide), from the inner circumferential side, lockup piston 80-side lateral portions of the corresponding outer springs SPo. The plurality of spring support portions 17e are opposed in the axial direction to the corresponding spring support portions 16e of the first output plate member 16 and serve to respectively support (guide), from the outer circumferential side, the lockup piston 80-side lateral portions of the corresponding outer springs SPo.

In the mounting state of the damper device 10, each of the outer springs SPo is placed between the corresponding spring support portions 16, 16e, 17d and 17e in the circumferential direction. Each of the outer springs SPo abuts on one pair of the outer spring abutting portions 16f and 17f provided on the respective sides of the spring support portions 16d, 16e, 17d and 17e when the input torque into the drive member 11 or the drive torque (or the torque applied from the axle side to the driven member 15 (driven torque)) reaches the above torque T1 and the torsion angle of the drive member 11 relative to the driven member 15 becomes equal to or larger than the predetermined angle θref. As shown in FIGS. 2 and 3, each of the outer springs SPo is arranged in an outer circumferential-side region in the fluid transmission chamber 9 such as to surround the first and the second inner springs SP1 and SP2. This configuration further shortens the axial length of the damper device 10 and thereby the axial length of the starting device 1.

As shown in FIG. 1, the damper device 10 includes a rotary inertia mass damper 20 that is connected with the drive member 11 and the driven member 15 and is arranged parallel to both the first torque transmission path TP1 and the second torque transmission path TP2. According to this embodiment, the rotary inertia mass damper 20 is configured by a single pinion-type planetary gear 21 placed between the drive member 11 that is the input element of the damper device 10 and the driven member 15 that is the output element of the damper device 10. The planetary gear 21 includes a sun gear (third element) 22 that is an external gear, a ring gear (second element) 23 that is an internal gear arranged concentrically with the sun gear 22, and a plurality of (for example, three according to this embodiment) pinion gear 24 that are arranged to respectively engage with the sun gear 22 and the ring gear 23.

The sun gear 22 of the planetary gear 21 has, for example, a slightly larger outer diameter than the inner diameter of the first output plate member 16 of the driven member 15 and includes a mass portion 22m that is arranged inside of a plurality of external teeth and is configured to increase the moment of inertia. The sun gear 22 is rotatably supported by the damper hub 7. The motion of the sun gear 22 in the axial direction of the starting device 1 is restricted by the damper hub 7 and the snap ring mounted to the damper hub 7. The ring gear 23 has, for example, a larger inner diameter than the spring support portions 16b and 17b of the first and the second output plate members 16 and 17 and is fixed to the driven member 15 by means of a plurality of rivets provided to couple the first output plate member 16 with the second output plate member 17. This configuration enables the ring gear 23 to be rotated integrally with the driven member 15.

The plurality of pinion gears 24 are rotatably supported by the lockup piston 80 via, for example, journal bearings 88 such that the pinion gears 24 are arranged at intervals (at equal intervals) in the circumferential direction and are opposed to regions between respective adjacent pairs of the first and the second inner springs SP1 and SP2 in the axial direction. As described above, the lockup piston 80 is rotatably supported by the damper hub 7 and is rotatable integrally with the drive member 11 that is the input element of the damper device 10. Accordingly the lockup piston 80 serves as a planetary carrier (first element) of the planetary gear 21 that supports the plurality of pinion gears 24 to be rotatable (rotatable on their own axes) and revolvable about the sun gear 22 and the ring gear 23.

When the lockup by the lockup clutch 8 is released in the starting device 1 having the configuration described above, as clearly understood from FIG. 1, the torque transmitted from the engine EG to the front cover 3 is transmitted to the input shaft IS of the transmission TM via the path of the pump impeller 4, the turbine runner 5, the intermediate member 12, the second inner springs SP2, the driven member 15 and the damper hub 7. When the lockup is engaged by the lockup clutch 8 in the starting device 1, on the other hand, the torque transmitted from the engine EG to the drive member 11 via the front cover 3 and the lockup clutch 8 is transmitted to the driven member 15 and the damper hub 7 via the first torque transmission path TP1 including the plurality of first inner springs SP1, the intermediate member 12 and the plurality of second springs SP2, and the rotary inertia mass damper 20 until the input torque reaches the above torque T1. When the input torque becomes equal to or higher than the above torque T1, however, the torque transmitted to the drive member 11 is transmitted to the driven member 15 and the damper hub 7 via the first torque transmission path TP1, the second torque transmission path TP2 including the plurality of outer springs SPo, and the rotary inertia mass damper 20.

When the drive member 11 is rotated (twisted) relative to the driven member 15 under engagement of the lockup (engagement of the lockup clutch 8), the first and the second inner springs SP1 and SP2 are deflected, and the sun gear 22 as the mass body is rotated with relative rotation of the drive member 11 to the driven member 15. More specifically, when the drive member 11 is rotated relative to the driven member 15, the rotation speed of the lockup piston 80 serving as the planetary carrier that is the input element of the planetary gear 21 (and the rotation speed of the drive member 11) is higher than the rotation speed of the driven member 15 that is rotated integrally with the ring gear 23. In this state, the rotation speed of the sun gear 22 is increased by the action of the planetary gear 21, so that the sun gear 22 is rotated at a higher rotation speed than the rotation speed of the lockup piston 80 and the drive member 11. This causes the moment of inertia (the inertia) to be applied from the sun gear 22 that is the mass body of the rotary inertia mass damper 20 to the driven member that is the output element of the damper device 10 and thereby damps the vibration of the driven member 15.

The rotary inertia mass damper 20 is configured to mainly transmit the inertia torque between the drive member 11 and the driven member 15 but not to transmit the average torque. In the damper device 10, when the input torque reaches the above torque T2, a stopper ST restricts the relative rotation of the drive member 11 to the driven member 15 and thereby restricts the deflections of all the first and the second inner springs SP1 and SP2 and the outer springs SPo. According to this embodiment, the stopper ST includes collars 19 mounted to a plurality of rivets provided to clamp the first and the second output plate members 16 and 17 (and the ring gear 23), and a plurality of openings 11s formed in the drive member 11, for example, in an arc shape. In the mounting state of the damper device 10, each of the collars 19 is arranged in the corresponding opening 11s of the drive member 11 such as not to abut on respective inner wall surfaces defining the opening 11s. When each of the collars 19 abuts on one of the inner wall surfaces of the corresponding opening 11s accompanied with relative rotation of the drive member 11 to the driven member 15, this restricts the relative rotation of the drive member 11 to the driven member 15 and the deflections of the springs SP1, SP2 and SPo.

The following describes a design procedure of the damper device 10.

As described above, in the damper device 10, until the input torque transmitted to the drive member 11 reaches the above torque T1, the first and the second inner springs SP1 and SP2 included in the first torque transmission path TP1 work in parallel to the rotary inertia mass damper 20. When the first and the second inner springs SP1 and SP2 work in parallel to the rotary inertia mass damper 20, the torque transmitted from the first torque transmission path TP1 including the intermediate member 12 and the first and the second inner springs SP1 and SP2 to the driven member 15 depends on (is proportional to) the displacement (amount of deflection or torsion angle) of the second inner springs SP2 between the intermediate member 12 and the driven member 15. The torque transmitted from the rotary inertia mass damper 20 to the driven member 15, on the other hand, depends on (is proportional to) a difference in angular acceleration between the drive member 11 and the driven member 15, i.e., a second order differential equation result of the displacement of the first and the second inner springs SP1 and SP2 between the drive member 11 and the driven member 15. On the assumption that the input torque transmitted to the drive member 11 of the damper device 10 is periodically vibrated as shown by Equation (1) given below, the phase of the vibration transmitted from the drive member 11 to the driven member 15 via the first torque transmission path TP1 is accordingly shifted by 180 degrees from the phase of the vibration transmitted from the drive member 11 to the driven member 15 via the rotary inertia mass damper 20.

[Math. 1]

$$T = T_0 \sin \omega t \quad (1)$$

Additionally, in the damper device 10 including the intermediate member 12, two natural frequencies (resonance frequencies) may be set in the state that the deflections of the first and the second inner springs SP1 and SP2 are allowed and the outer springs SPo are not deflected. On the assumption that transmission of the torque from the engine EG to the drive member 11 is started under engagement of the lockup by the lockup clutch 8, the resonance by the vibration of the drive member 11 and the driven member 15 in the opposite phases and the resonance mainly in the transmission (first resonance, shown as a resonance point R1 in FIG. 4) between the drive member 11 and a non-illustrated driveshaft occur in the first torque transmission path TP1 in the state that the deflections of the first and the second inner springs SP1 and SP2 are allowed and the outer springs SPo are not deflected.

The intermediate member 12 of the first torque transmission path TP1 is formed in an annular shape. This causes the inertia force applied to the intermediate member 12 to be greater than the resistance force of interfering with vibration of the intermediate member 12 (frictional force caused by the centrifugal force mainly applied to the rotating intermediate member 12) in the process of transmitting the torque from the engine EG to the drive member 11. Accordingly, a damping ratio $\zeta$ of the intermediate member 12 that is vibrated with transmission of the torque from the engine EG to the drive member 11 becomes less than a value 1. The damping ratio $\zeta$ of the intermediate member 12 in a single-degree-of-freedom system may be expressed as $\zeta = C/(2 \cdot \sqrt{(J_2 \cdot (k_1 + k_2))})$. Herein "$J_2$" denotes a moment of inertia of the intermediate member 12 (total moment of inertia of the intermediate member 12 and the turbine runner according to this embodiment), "$k_1$" denotes a combined spring constant of the plurality of first inner springs SP1 working in parallel between the drive member 11 and the intermediate member 12, "$k_2$" denotes a combined spring constant of the plurality of second inner springs SP2 working in parallel between the intermediate member 12 and the driven member 15, and "C" denotes a damping force (resistance fore) per unit speed of the intermediate member 12 that interferes with the vibration of the intermediate member 12. Accordingly the damping ratio $\zeta$ of the intermediate member 12 is determined based on at least the moment of inertia $J_2$ of the intermediate member 12 and the rigidities $k_1$ and $k_2$ of the first and the second inner springs SP1 and SP2.

The above damping force C may be determined by a procedure given below. When a displacement x of the intermediate member 12 is expressed as $x = A \cdot \sin(\omega_{12} \cdot t)$, a loss energy Sc by the above damping force C may be expressed as $Sc = \pi \cdot C \cdot A^2 \cdot \omega_{12}$ (where "A" denotes an amplitude and "$\omega_{12}$" denotes a vibration frequency of the intermediate member 12). Additionally, when the displacement x of the intermediate member 12 is expressed as $x = A \cdot \sin(\omega_{12} \cdot t)$, a loss energy Sh by the above hysteresis H in one cycle vibration of the intermediate member 12 may be expressed as $Sh = 2 \cdot H \cdot A$. On the assumption that the loss energy Sc by the above damping force C is equal to the loss energy Sh by the hysteresis H, the above damping force C may be expressed as $C = (2 \cdot H)/(\pi \cdot A \cdot \omega_{12})$.

Figure 4:
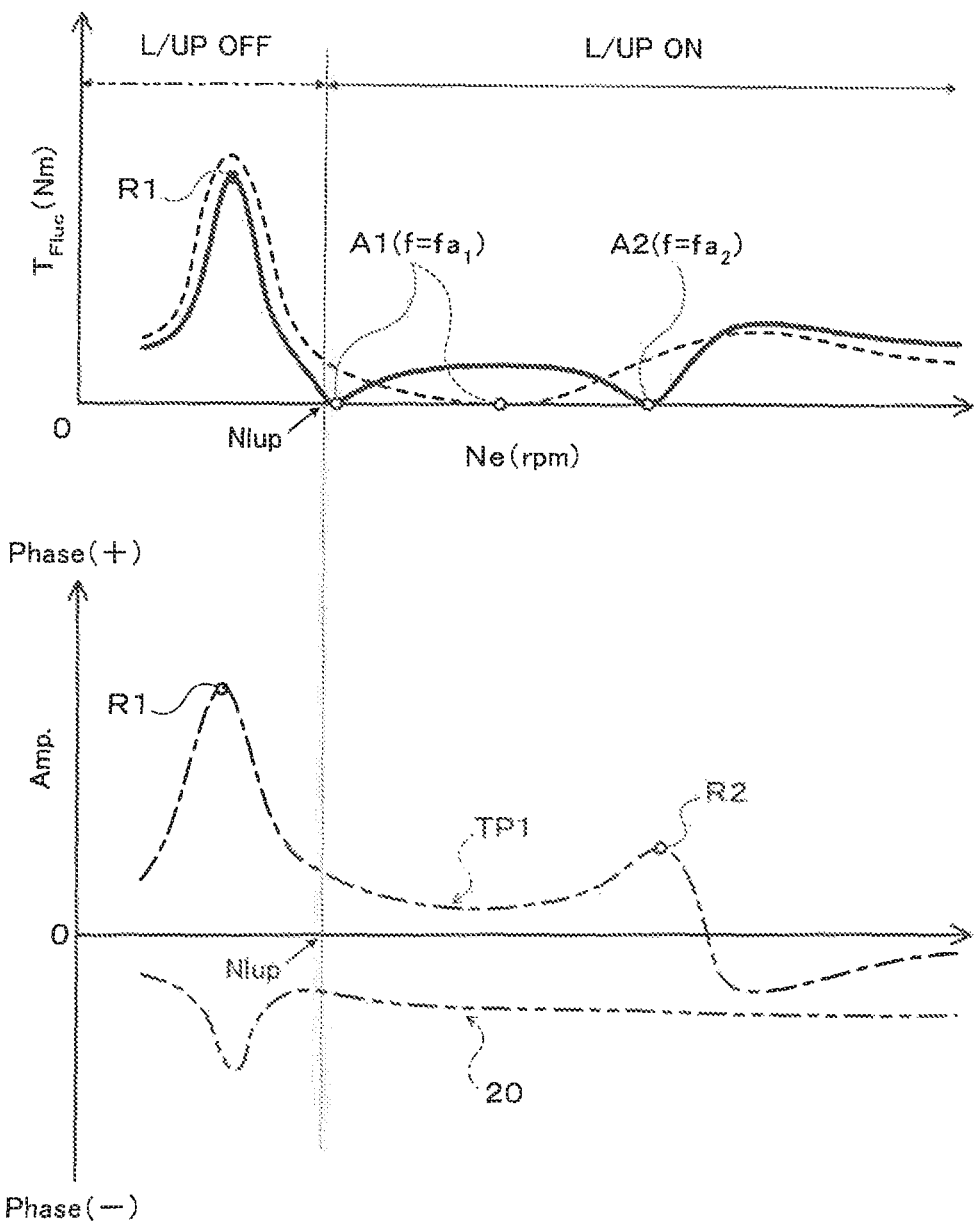
FIG. 4 is a diagram illustrating a relationship of rotation speed of an engine to torque variation $T_{Fluc}$ at an output element in the damper device of FIG. 1 and other drawings.

Additionally, a natural frequency $f_{12}$ of the intermediate member 12 in the single-degree-of-freedom system is expressed as $f_{12}=\frac{1}{2}\pi\cdot\sqrt{((k_1+k_2)/J_2)}$. Forming the intermediate member 12 in an annular shape relatively increases the moment of inertia $J_2$, so that the natural frequency $f_{12}$ of the intermediate member 12 relatively decreases. Accordingly, as shown in FIG. 4, in the state that the deflections of the first and the second inner springs SP1 and SP2 are allowed and the outer springs SPo are not deflected, the resonance of the intermediate member 12 (second resonance, shown as a resonance point R2 in FIG. 4) by the vibration of the intermediate member 12 in the opposite phase to those of the drive member 11 and the driven member 15 occurs in the first torque transmission path TP1 at the stage when the rotation speed of the drive member 11 reaches a rotation speed corresponding to the greater between the two natural frequencies, i.e., at a higher rotation speed (higher frequency) than the first resonance.

In order to further improve the vibration damping effect of the damper device 10 having the above characteristics, as the result of intensive studies and analyses, the inventors have noted that the damper device 10 can damp the vibration of the driven member 15 by making the amplitude of the vibration of the first torque transmission path TP1 equal to the amplitude of the vibration of the rotary inertia mass damper 20 in the opposite phase. The inventors have established an equation of motion as shown by Equation (2) given below in a vibration system including the damper device 10 in which the torque is transmitted from the engine EG to the drive member 11 under engagement of the lockup and the outer springs SPo are not deflected. In Equation (2), "$J_1$" denotes a moment of inertia of the drive member 11, "$J_2$" denotes the moment of inertia of the intermediate member 12 as described above, "$J_3$" denotes a moment of inertia of the driven member 15, and "$J_i$" denotes a moment of inertia of the sun gear 22 that is the mass body of the rotary inertia mass damper 20. Additionally, "$\theta_1$" denotes a torsion angle of the drive member 11, "$\theta_2$" denotes a torsion angle of the intermediate member 12, "$\theta_3$" denotes a torsion angle of the driven member 15, and "$\lambda$" denotes a gear ratio of the planetary gear 21 (number of teeth of the sun gear 22/number of teeth of the ring gear 23) included in the rotary inertia mass damper 20.

[Math. 2]

$$\begin{bmatrix} J_1 + J_i \cdot \frac{(1+\lambda)^2}{\lambda^2} & 0 & -J_i \cdot \frac{1+\lambda}{\lambda^2} \\ 0 & J_2 & 0 \\ -J_i \cdot \frac{1+\lambda}{\lambda^2} & 0 & J_3 + J_i \cdot \frac{1}{\lambda^2} \end{bmatrix} \begin{bmatrix} \ddot{\theta}_1 \\ \ddot{\theta}_2 \\ \ddot{\theta}_3 \end{bmatrix} + \begin{bmatrix} k_1 & -k_1 & 0 \\ -k_1 & k_1+k_2 & -k_2 \\ 0 & -k_2 & k_2 \end{bmatrix} \begin{bmatrix} \theta_1 \\ \theta_2 \\ \theta_3 \end{bmatrix} = \begin{bmatrix} T \\ 0 \\ 0 \end{bmatrix} \quad (2)$$

Additionally, the inventors have assumed that the input torque T is periodically vibrated as shown by Equation (1) given above and have also assumed that the torsion angle $\theta_1$ of the drive member 11, the torsion angle $\theta_2$ of the intermediate member 12 and the torsion angle $\theta_3$ of the driven member 15 are periodically responded (vibrated) as shown by Equation (3) given below. In Equations (1) and (3), "$\omega$" denotes an angular frequency in the periodical fluctuation (vibration) of the input torque T. In Equation (3), "$\Theta_1$" denotes an amplitude of the vibration (vibration amplitude, i.e., maximum torsion angle) of the drive member 11 generated during transmission of the torque from the engine EG, "$\Theta_2$" denotes an amplitude of vibration (vibration amplitude) of the intermediate member 12 generated during transmission of the torque from the engine EG to the drive member 11, and "$\Theta_3$" denotes an amplitude of vibration (vibration amplitude) of the driven member 15 generated during transmission of the torque from the engine EG to the drive member 11. On such assumptions, an identity of Equation (4) given below is obtained by substituting Equations (1) and (3) into Equation (2) and eliminating "sin $\omega t$" from both sides.

[Math. 3]

$$\begin{bmatrix} \theta_1 \\ \theta_2 \\ \theta_3 \end{bmatrix} = \begin{bmatrix} \Theta_1 \\ \Theta_2 \\ \Theta_3 \end{bmatrix} \sin \omega t \quad (3)$$

$$\begin{bmatrix} T_0 \\ 0 \\ 0 \end{bmatrix} = \begin{bmatrix} k_1 - \omega^2\left(J_1 + J_i \cdot \frac{(1+\lambda)^2}{\lambda^2}\right) & -k_1 & \omega^2\left(J_i \cdot \frac{1+\lambda}{\lambda^2}\right) \\ -k_1 & k_1 + k_2 - \omega^2 J_2 & -k_2 \\ \omega^2\left(J_i \cdot \frac{1+\lambda}{\lambda^2}\right) & -k_2 & k_2 - \omega^2\left(J_3 + J_i \cdot \frac{1}{\lambda^2}\right) \end{bmatrix} \begin{bmatrix} \Theta_1 \\ \Theta_2 \\ \Theta_3 \end{bmatrix} \quad (4)$$

In Equation (4), when the vibration amplitude $\Theta_3$ of the driven member 15 is zero, this means that the vibration from the engine EG is theoretically damped completely by the damper device 10 and that no vibration is theoretically transmitted to the transmission TM, the driveshaft and the like located downstream of the driven member 15. From this point of view, the inventors have obtained a conditional expression of Equation (5) by solving the identity of Equation (4) with respect to the vibration amplitude $\Theta_3$ and setting $\Theta_3=0$. Equation (5) is a quadratic equation with regard to the square of angular frequency $\omega^2$ in the periodical fluctuation of the input torque T. When the square of angular frequency $\omega^2$ is either of two real roots (or multiple root) of Equation (5), the vibration from the engine EG transmitted from the drive member 11 to the driven member 15 via the first torque transmission path TP1 and the vibration transmitted from the drive member 11 to the driven member 15 via the rotary inertia mass damper 20 are cancelled out each other, and the vibration amplitude $\Theta_3$ of the driven member 15 theoretically becomes equal to zero.

[Math. 4]

$$J_2 \cdot J_i \cdot \frac{1+\lambda}{\lambda^2}(\omega^2)^2 - J_i \cdot \frac{1+\lambda}{\lambda^2} \cdot (k_1 + k_2) \cdot \omega^2 + k_1 \cdot k_2 = 0 \quad (5)$$

This result of analysis indicates that a total of two antiresonance points providing theoretically zero vibration amplitude $\Theta_3$ of the driven member 15 may be set in the damper device 10 that includes the intermediate member 12 and accordingly provides two peaks, i.e., a resonance in the torque transmitted via the first torque transmission path TP1 as shown in FIG. 4. The damper device 10 can thus significantly effectively damp the vibration of the driven member 15 by making the amplitude of the vibration of the first torque transmission path TP1 equal to the amplitude of the vibration of the rotary inertia mass damper 20 in the opposite phase at two points corresponding to the two resonances occurring in the first torque transmission path TP1.

Additionally, in the damper device 10, the resonance of the intermediate member 12 occurs in the stage where the rotation speed of the drive member 11 becomes rather higher than a rotation speed corresponding to the frequency at an antiresonance point A1 of the lower rotation speed (the lower frequency). The amplitude of the vibration transmitted from the second inner springs SP2 to the driven member 15 changes from decreasing to increasing before the rotation speed of the drive member 11 (engine EG) reaches a rotation speed corresponding to the relatively low natural frequency of the intermediate member 12, as shown by a one-dot chain line curve in FIG. 4. Even when the amplitude of the vibration transmitted from the rotary inertia mass damper 20 to the driven member 15 is gradually increased with an increase in rotation speed of the drive member 11 (as shown by a two-dot chain line curve in FIG. 4), this expands an area where the vibration transmitted from the rotary inertia mass damper 20 to the driven member 15 cancels out at least part of the vibration transmitted from the second inner springs SP2 to the driven member 15. This results in further improving the vibration damping performance of the damper device 10 in a relatively low rotation speed range of the drive member 11.

A vehicle equipped with the engine EG as the source of generating power for driving may be configured as to further decrease a lockup rotation speed Nlup of the lockup clutch 8 (rotation speed at the time of first coupling of the engine EG with the damper device 10 after a start of the engine EG and the lowest among a plurality of lockup rotation speeds; in other words, minimum rotation speed in a rotation speed range where the torque is transmitted from the drive member 11 through the torque transmission path TP1 to the driven member 15) and mechanically transmit the torque from the engine EG to the transmission TM at an earlier timing, such as to improve the power transmission efficiency between the engine EG and the transmission TM and thereby further improve the fuel consumption of the engine EG. The vibration transmitted from the engine EG via the lockup clutch 8 to the drive member 11, however, increase in a low rotation speed range of approximately 500 rpm to 1500 rpm that is likely to be set as a range of the lockup rotation speed Nlup. The vibration level significantly increases especially in a vehicle equipped with a smaller-number cylinder engine such as three-cylinder engine or four-cylinder engine. Accordingly, in order to suppress transmission of a large vibration to the transmission TM and so on during or immediately after engagement the lockup, there is a need to further reduce the vibration level in a rotation speed range of about the lockup rotation speed Nlup of the entire damper device 10 (driven member 15) configured to transmit the torque (vibration) from the engine EG to the transmission TM under engagement of the lockup.

By taking into account the foregoing, the inventors have configured the damper device 10 such as to form the antiresonance point A1 of the lower rotation speed (the lower frequency) when the rotation speed Ne of the engine EG is in the range of 500 rpm to 1500 rpm (in the expected setting range of the lockup rotation speed Nlup), based on the predetermined lockup rotation speed Nlup of the lockup clutch 8. Two solutions $\omega_1$ and $\omega_2$ of Equation (5) given above may be obtained as Equations (6) and (7) given below according to the quadratic formula, and $\omega_1 < \omega_2$. A frequency $fa_1$ at the antiresonance point A1 of the lower rotation speed (the lower frequency) (hereinafter referred to as "minimum frequency") is expressed by Equation (8) given below, and a frequency $fa_2$ at an antiresonance point A2 of the higher rotation speed (the higher frequency) ($fa_2 > fa_1$) is expressed by Equation (9) given below. A rotation speed $Nea_1$ of the engine EG corresponding to the minimum frequency $fa_1$ is expressed as $Nea_1 = (120/n) \cdot fa_1$, where "n" denotes the number of cylinders of the engine EG.

[Math. 5]

$$\omega_1^2 = \frac{(k_1+k_2) - \sqrt{(k_1+k_2)^2 - 4 \cdot \frac{J_2}{J_i} \cdot \frac{\lambda^2}{1+\lambda} \cdot k_1 \cdot k_2}}{2 \cdot J_2} \quad (6)$$

$$\omega_2^2 = \frac{(k_1+k_2) + \sqrt{(k_1+k_2)^2 - 4 \cdot \frac{J_2}{J_i} \cdot \frac{\lambda^2}{1+\lambda} \cdot k_1 \cdot k_2}}{2 \cdot J_2} \quad (7)$$

$$fa_1 = \frac{1}{2\pi}\sqrt{\frac{(k_1+k_2) - \sqrt{(k_1+k_2)^2 - 4 \cdot \frac{J_2}{J_i} \cdot \frac{\lambda^2}{1+\lambda} \cdot k_1 \cdot k_2}}{2 \cdot J_2}} \quad (8)$$

$$fa_2 = \frac{1}{2\pi}\sqrt{\frac{(k_1+k_2) + \sqrt{(k_1+k_2)^2 - 4 \cdot \frac{J_2}{J_i} \cdot \frac{\lambda^2}{1+\lambda} \cdot k_1 \cdot k_2}}{2 \cdot J_2}} \quad (9)$$

Accordingly, the combined spring constant $k_1$ of the plurality of first inner springs SP1, the combined spring constant $k_2$ of the plurality of second inner springs SP2, the moment of inertia $J_2$ of the intermediate member 12 (determined by taking into account (summing up) the moments of inertia of the turbine runner 5 and the like coupled to be integrally rotated), and the moment of inertia $J_1$ of the sun gear 22 that is the mass body of the rotary inertia mass damper 20 are selected and set in the damper device 10, in order to satisfy Expression (10) given below. More specifically, in the damper device 10, the spring constants $k_1$ and $k_2$ of the first and the second inner springs SP1 and SP2 and the moment of inertia $J_2$ of the intermediate member 12 are determined, based on the above minimum frequency $fa_1$ (and the lockup rotation speed Nlup).

[Math. 6]

$$500 \text{ rpm} \leq \frac{120}{n} \cdot fa \leq 1500 \text{ rpm} \quad (10)$$

As described above, the antiresonance point A1 of the lower rotation speed that is likely to provide theoretically zero vibration amplitude $\Theta_3$ of the driven member 15 (that is likely to further decrease the vibration amplitude $\Theta_3$) may be set in the low rotation speed range of 500 rpm to 1500 rpm (in the expected setting range of the lockup rotation speed Nlup). As shown in FIG. 4, this shifts one resonance having the lower frequency (first resonance) out of the resonances occurring in the first torque transmission path TP1 toward the lower rotation speed (toward the lower frequency), such as to be included in a non-lockup area of the lockup clutch 8 (shown by the two-dot chain line curve in FIG. 4). According to this embodiment, the resonance at the resonance point R1 (i.e., resonance at the lower natural frequency between two natural frequencies) is thus a virtual resonance that does not occur in the rotation speed range where the damper device 10 is used. This results in allowing for the lockup (coupling of the engine EG with the drive member 11) at the lower rotation speed.

When the damper device 10 is configured to satisfy Expression (10), it is preferable to select and set the spring constants $k_1$ and $k_2$ and the moments of inertia $J_2$ and $J_i$, such as to minimize the frequency of the lower rotation-speed (lower-frequency) resonance (at the resonance point R1 shown as resonance point R1 in FIG. 4) occurring in the first torque transmission path TP1 to the minimum possible value that is lower than the above minimum frequency $fa_1$. This further reduces the minimum frequency $fa_1$ and allows for the lockup at the further lower rotation speed.

Moreover, the configuration that the two antiresonance points A1 and A2 are set enables the antiresonance point A1 having the minimum frequency ($fa_1$) between the two antiresonance points A1 and A2 to be shifted toward the lower frequency, compared with the configuration that only one antiresonance point is set (shown by a broken line curve in FIG. 4). Additionally, as clearly understood from FIG. 4, the configuration that the two antiresonance points A1 and A2 are set enables the vibration from the engine EG transmitted from the drive member 11 to the driven member 15 via the first torque transmission path TP1 (shown by the one-dot chain line curve in FIG. 4) to be effectively damped by the vibration transmitted from the drive member 11 to the driven member 15 via the rotary inertia mass damper 20 (shown by the two-dot chain line curve in FIG. 4) in a relatively wide rotation speed range between the two antiresonance points A1 and A2.

This further improves the vibration damping effect of the damper device 10 in the lower rotation speed range of a lockup area that is likely to increase the vibration from the engine EG. In the damper device 10, on the occurrence of the second resonance (second resonance as shown by the resonance point R2 in FIG. 4), the intermediate member 12 is vibrated in the opposite phase to that of the driven member 15. As shown by the one-dot chain line curve in FIG. 4, the phase of the vibration transmitted from the drive member 11 to the driven member 15 via the first torque transmission path TP1 becomes identical with the phase of the vibration transmitted from the drive member 11 to the driven member 15 via the rotary inertia mass damper 20.

In the damper device 10 configured as described above, in order to further improve the vibration damping performance around the lockup rotation speed Nlup, there is a need to appropriately separate the lockup rotation speed Nlup and the rotation speed of the engine EG corresponding to the resonance point R2. Accordingly, when the damper device 10 is configured to satisfy Expression (10), it is preferable to select and set the spring constants $k_1$ and $k_2$ and the moments of inertia $J_2$ and $J_i$, such as to satisfy Nlup≤(120/n)·$fa_1$ (=Nea$_1$). This engages the lockup by the lockup clutch 8, while effectively suppressing transmission of the vibration to the input shaft IS of the transmission TM. This also enables the vibration from the engine EG to be remarkably effectively damped by the damper device 10, immediately after engagement of the lockup.

Additionally, coupling the intermediate member 12 with the turbine runner 5 to be integrally rotated further increases the substantial moment of inertia $J_2$ of the intermediate member 12 (total moment of inertia of the intermediate member 12, the turbine runner 5 and the like). This further decreases the frequency $fa_1$ at the antiresonance point A1 and enables the antiresonance point A1 to be set at the lower rotation speed (at the lower frequency) as clearly understood from Equation (8).

As described above, designing the damper device 10 based on the frequency (minimum frequency) $fa_1$ at the antiresonance point A1 remarkably effectively improves the vibration damping performance of the damper device 10. According to the inventors' studies and analyses, it has been confirmed that when the lockup rotation speed Nlup is set to, for example, a value of about 1000 rpm, the damper device 10 configured to satisfy, for example, 900 rpm≤ (120/n)·$fa_1$≤1200 rpm provides the remarkably effective results in practice.

The rotary inertia mass damper 20 included in the damper device 10 described above includes the lockup piston 80 that serves as the planetary carrier (first element) rotating integrally with the drive member 11, and the planetary gear 21 that includes the ring gear 23 (second element) rotating integrally with the driven member 15 and the sun gear 22 (third element as the mass body) rotating integrally with the mass portion 22m. This configuration increases the rotation speed of the sun gear 22 as the mass body to be higher than the rotation speed of the drive member 11. Accordingly this reduces the mass body of the rotary inertia mass damper 20, while effectively ensuring the moment of inertia applied from the rotary inertia mass damper 20 to the driven member 15. This also enhances the flexibility in design of the rotary inertia mass damper 20 and the entire damper device 10. The planetary gear 21 of the rotary inertia mass damper 20 may, however, be configured to decrease the rotation speed of the mass body (sun gear 22) to be lower than the rotation speed of the drive member 11, according to the magnitude of the moment of inertia of the mass body. The rotary inertia mass damper 20 may include, for example, a differential with a link mechanism and so on, other than the planetary gear 21. Additionally, depending on the magnitude of the moment of inertia of the mass body, the rotary inertia mass damper 20 may be a constant speed rotation mechanism configured to rotate the mass body at the same speed as that of the drive member 11. The rotary inertia mass damper 20 may include a speed change mechanism configured to change the rotation speed of the mass body according to the rotation speed of relative rotation of the drive member 11 to the driven member 15.

As described above, the configuration that two antiresonance points A1 and A2 are set enables the antiresonance point A1 to be shifted toward the lower frequency. Depending on the specification of the vehicle, the motor and so on equipped with the damper device 10, the multiple root of Equation (5) (=½π·√{($k_1$+$k_2$)/(2·$J_2$)} may be set to the above minimum frequency $fa_1$. Determining the spring constants $k_1$ and $k_2$ of the first and the second inner springs SP1 and SP2 and the moment of inertia $J_2$ of the intermediate member 12 based on the multiple root of Equation (5) also improves the vibration damping effect of the damper device 10 in the lower rotation speed range of the lockup area that is likely to increase the vibration from the engine EG as shown by the broken line curve in FIG. 4.

In the damper device 10 described above, springs having the identical specification (spring constant) are employed for the first and the second inner springs SP1 and SP2. This is, however, not restrictive. The spring constants $k_1$ and $k_2$ of the first and the second inner springs SP1 and SP2 may be different from each other ($k_1$>$k_2$ or $k_1$<$k_2$). This further increases the value of the √ term (discriminant) in Equations (6) and (8) and further increases the interval between the two antiresonance points A1 and A2, thus further improving the vibration damping effect of the damper device in the low frequency range (low rotation speed range). In this case, the damper device 10 may be provided with a stopper configured to restrict the deflection of one of the first and the second inner springs SP1 and SP2 (for example, one having the lower rigidity).

Moreover, in the damper device 10 described above, the plurality of pinion gears 24 of the planetary gear 21 configuring the rotary inertia mass damper 20 are supported by the lockup piston 80 that serves as the planetary carrier. The plurality of pinion gears 24 of the planetary gear 21 may be rotatably supported by the drive member 11 of the damper device 10. In other words, the drive member 11 itself may be used as the planetary carrier of the planetary gear 21. As shown by the two-dot chain line in FIG. 1, the turbine runner 5 may be coupled with either one of the drive member 11 and the driven member 15. Even when the turbine runner 5 is not coupled with the intermediate member 12, formation of the intermediate member 12 in the annular shape suppresses the motion of the intermediate member 12 in the radial direction by the centrifugal force. The damping ratio ζ of the intermediate member 12 that is vibrated with transmission of the torque from the engine EG to the drive member 11 thus basically becomes less than the value 1.

Additionally, the rotary inertia mass damper 20 (planetary gear 21) may be configured such that the ring gear 23 (first element) is rotated integrally with the drive member 11 (lockup piston 80) and that the planetary carrier (second element) is rotated integrally with the driven member 15. The rotary inertia mass damper 20 (planetary gear 21) may be configured such that the ring gear 23 (first element) is rotated integrally with the drive member 11 (lockup piston 80), that the sun gear 22 (second element) is rotated integrally with the driven member 15 and that the planetary carrier (third element) is rotated integrally with the mass portion (mass body). In the latter configuration, the mass portion may be arranged on at least one of the outer side in the radial direction of the ring gear 23 and the inner side in the radial direction of the sun gear 22. Furthermore, the rotary inertia mass damper 20 (planetary gear 21) may be configured such that the sun gear 22 (first element) is rotated integrally with the drive member 11 (lockup piston 80), that the ring gear 23 (second element) is rotated integrally with the driven member 15 and that the planetary carrier (third element) is rotated integrally with the mass portion (mass body). In this configuration, the mass portion may be arranged on at least one of the outer side in the radial direction of the ring gear 23 and the inner side in the radial direction of the sun gear 22.

Figure 5:
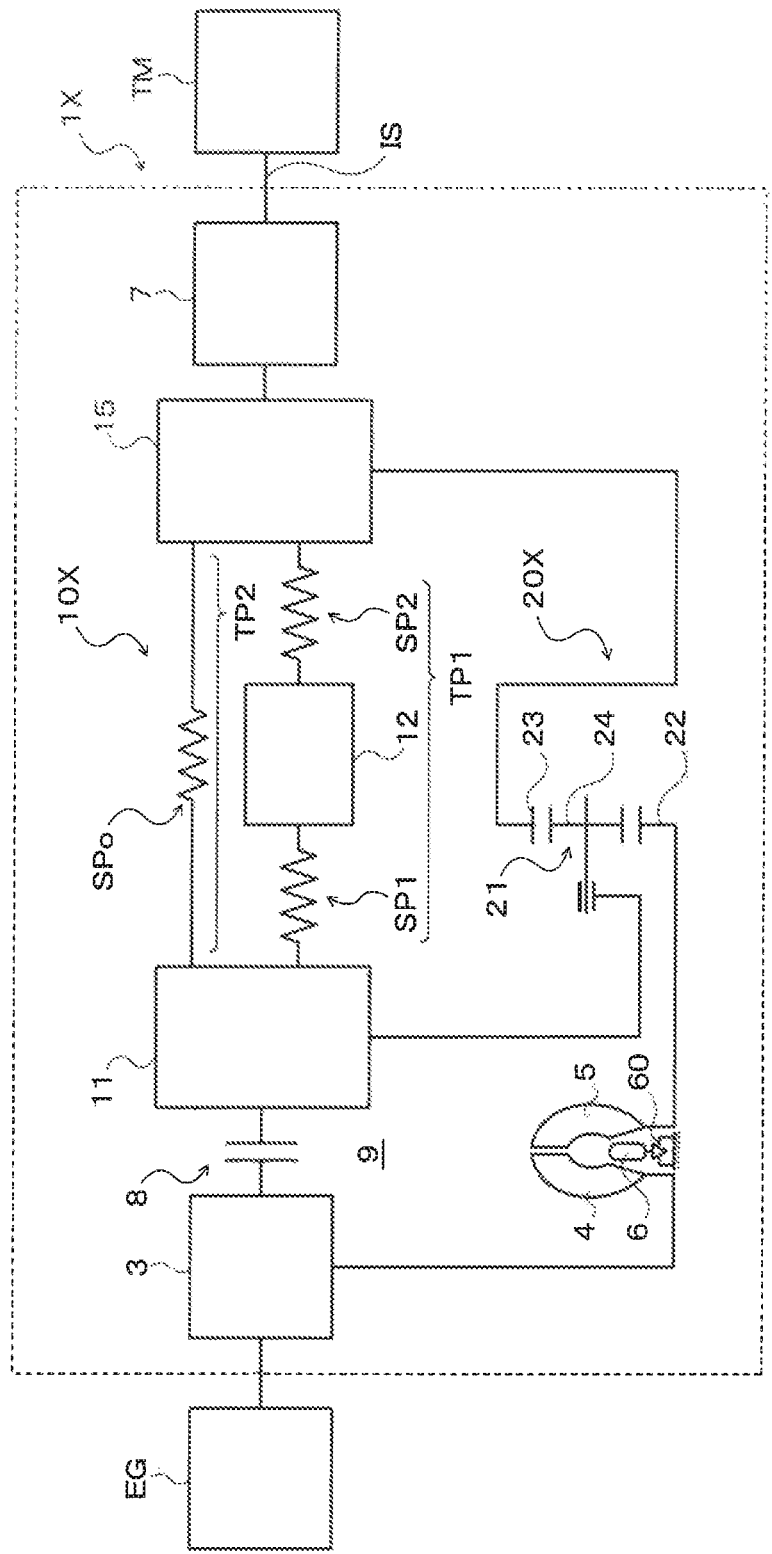
FIG. 5 is a schematic configuration diagram illustrating a starting device according to another embodiment of the disclosure.

FIG. 5 is a schematic configuration diagram illustrating a starting device 1X including a damper device 10X according to another embodiment of the disclosure. Among the components of the starting device 1X and the damper device 10X, the same components to those of the starting device 1 and the damper device 10 described above are expressed by the same reference signs and their repeated description is omitted.

In the damper device 10X shown in FIG. 5, a turbine runner 5 that configures, in combination with a pump impeller 4, a torque converter (fluid transmission device) is coupled via a coupling member with a sun gear 22 of a planetary gear 21 configuring a rotary inertia mass damper 20X. In other words, the rotary inertia mass damper 20X includes the turbine runner 5 as the mass body that is rotated with relative rotation of the drive member 11 to the driven member 15. This configuration further increases the moment of inertia of the mass body of the rotary inertia mass damper 20X and further increases the moment of inertia applied from the rotary inertia mass damper 20X to the driven member 15, while suppressing overall size expansion of the damper device 10, compared with a configuration equipped with a dedicated mass body (mass portion).

Figure 6:
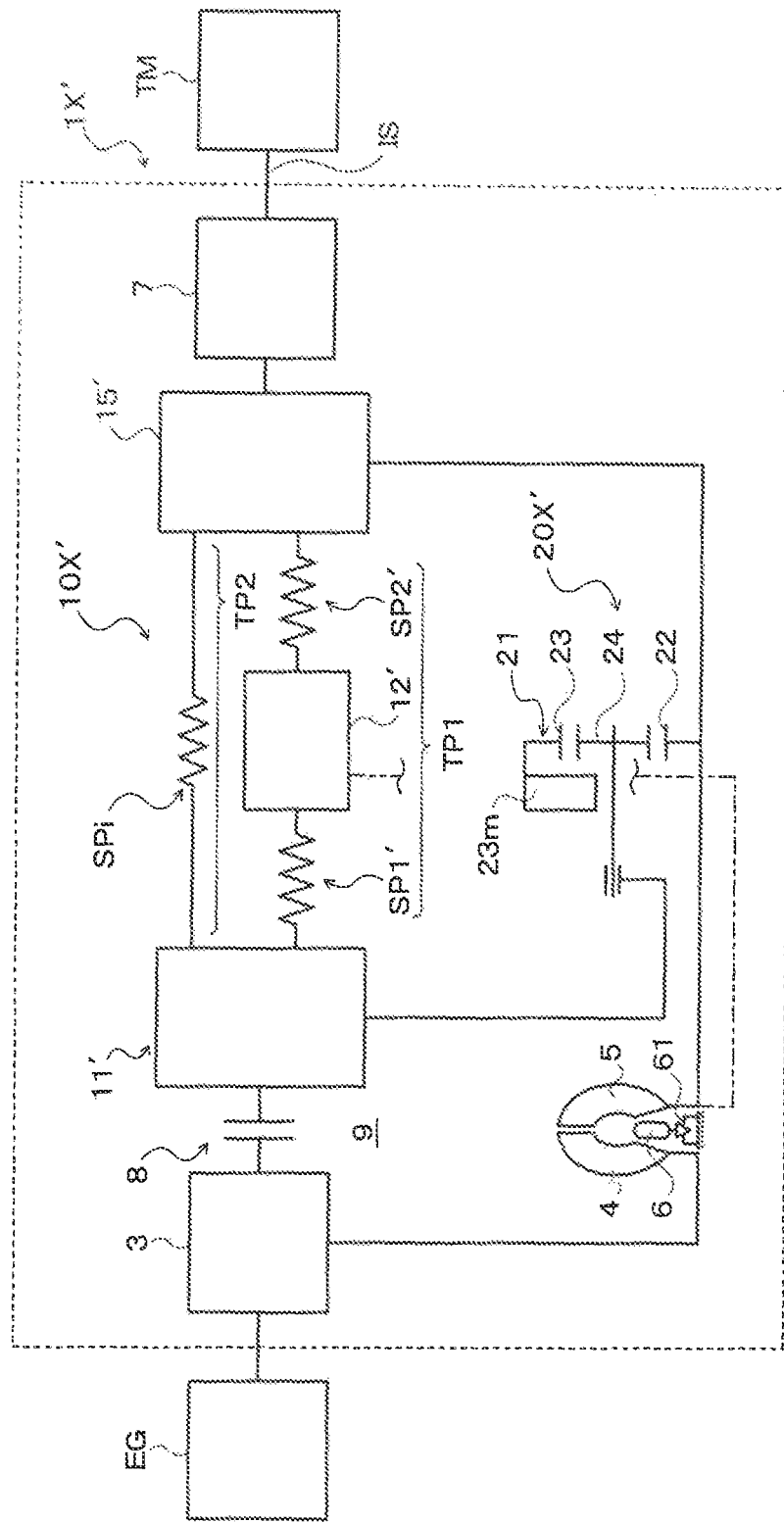
FIG. 6 is a schematic configuration diagram illustrating a starting device according to yet another embodiment of the disclosure.

FIG. 6 is a schematic configuration diagram illustrating a starting device 1X' including a damper device 10X' according to yet another embodiment of the disclosure. Among the components of the starting device 1X' and the damper device 10X', the same components to those of the starting device 1 and the damper device 10 described above are expressed by the same reference signs and their repeated description is omitted.

The damper device 10X' shown in FIG. 6 includes a drive member (input element) 11', an intermediate member (intermediate element) 12' and a driven member (output element) 15', as rotational elements. The damper device 10X' also includes a plurality of first springs (first elastic bodies) SP1' configured to transmit the torque between the drive member 11' and the intermediate member 12' and a plurality of second springs (second elastic bodies) SP2' configured to respectively work in series with the corresponding first springs SP1' and to transmit the torque between the intermediate member 12' and the driven member 15', as torque transmission elements (torque transmission elastic bodies). The plurality of first springs (first elastic bodies) SP1', the intermediate member 12' and the plurality of second springs (second elastic bodies) SP2' form a torque transmission path TP1 between the drive member 11' and the driven member 15'. The intermediate member 12' is an annular member. A damping ratio (of the intermediate member 12' that is vibrated with transmission of the torque from the engine EG to the drive member 11' is less than the value 1.

The damper device 10X' further includes a plurality of inner springs SPi configured to transmit the torque between the drive member 11' and the driven member 15'. Like the outer springs SPo of the damper device 10 described above, the plurality of inner springs SPi are configured to work in parallel to the first and the second springs SP1' and SP2' forming the torque transmission path TP1, after the input torque into the drive member 11' reaches the above torque (first threshold value) T1 and the torsion angle of the drive member 11' relative to the driven member 15' becomes equal to or larger than the above predetermined angle θref. In the illustrated example of FIG. 6, the springs SPi are arranged on the inner side in the radial direction of the first and the second springs SP1' and SP2' to be surrounded by the first and the second springs SP1' and SP2'.

In the damper device 10X', the drive member 11' supports a plurality of pinion gears 24 to be rotatable (rotatable on their own axes) and revolvable about a sun gear 22 and a ring gear 23, and serves as a planetary carrier (first element) of a planetary gear 21 configuring a rotary inertia mass damper 20X'. Furthermore, the sun gear (second element) 22 is coupled with the driven member 15' to be integrally rotated. Accordingly the ring gear 23 and a mass portion 23m as the mass body (third element) are rotated with relative rotation of the drive member 11' to the driven member 15'. This damper device 10X' provides the similar functions and advantageous effects to those of the damper device 10 and so on described above. The rotary inertia mass damper 20X' (planetary gear 21) may be configured such that the sun gear 22 (first element) is rotated integrally with the drive member 11' and that the planetary carrier (second element) is rotated integrally with the driven member 15', although not being specifically illustrated.

Figure 7:
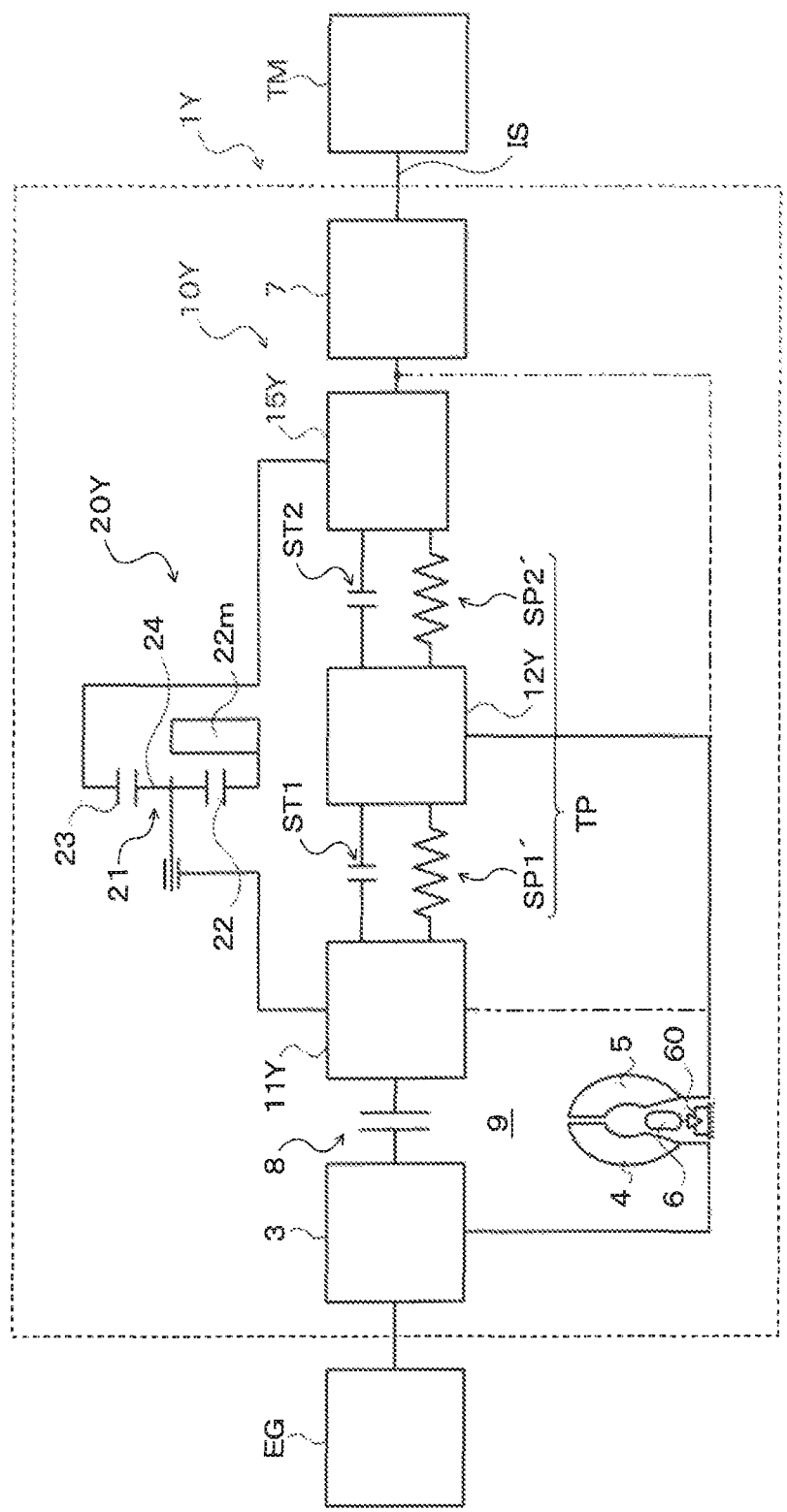
FIG. 7 is a schematic configuration diagram illustrating a starting device according to another embodiment of the disclosure.

FIG. 7 is a schematic configuration diagram illustrating a starting device 1Y including a damper device 10Y according to another embodiment of the disclosure. Among the components of the starting device 1Y and the damper device 10Y, the same components to those of the starting device 1 and the damper device 10 described above are expressed by the same reference signs and their repeated description is omitted.

The damper device 10Y shown in FIG. 7 includes a drive member (input element) 11Y, an intermediate member (intermediate element) 12Y and a driven member (output element) 15Y, as rotational elements. The damper device 10Y also includes a plurality of first springs (first elastic bodies) SP1' configured to transmit the torque between the drive member 11Y and the intermediate member 12Y and a plurality of second springs (second elastic bodies) SP2' configured to respectively work in series with the corresponding first springs SP1' and to transmit the torque between the intermediate member 12Y and the driven member 15Y, as torque transmission elements (torque transmission elastic bodies). The plurality of first springs (first elastic bodies) SP1', the intermediate member 12Y and the plurality of second springs (second elastic bodies) SP2' form a torque transmission path TP between the drive member 11Y and the driven member 15Y. The intermediate member 12Y is an annular member. A damping ratio $\zeta$ of the intermediate member 12Y that is vibrated with transmission of the torque from the engine EG to the drive member 11Y is less than the value 1. Like the rotary inertia mass damper 20, a rotary inertia mass damper 20Y is configured by a single pinion-type planetary gear 21 and is connected with the drive member 11Y and the driven member 15Y and arranged in parallel to the torque transmission path TP to mainly transmit an inertia torque to the driven member 15Y. Furthermore, as illustrated, the intermediate member 12Y is coupled with the turbine runner 5 to be integrally rotated. As shown by a two-dot chain line in FIG. 7, however, the turbine runner 5 may be coupled with either one of the drive member 11Y and the driven member 15Y.

The damper device 10Y further includes a first stopper ST1 configured to restrict the relative rotation of the drive member 11Y to the intermediate member 12Y, i.e., deflection of the first springs SP1' and a second stopper ST2 configured to restrict the relative rotation of the intermediate member 12Y to the driven member 15Y, i.e., deflection of the second springs SP2'. One of the first stopper ST1 and the second stopper ST2 is configured to restrict the relative rotation of the drive member 11Y to the intermediate member 12Y or the relative rotation of the intermediate member 12Y to the driven member 15Y when the input torque into the drive member 11Y reaches a predetermined torque T1 that is smaller than a torque T2 corresponding to a maximum torsion angle θmax of the damper device 10Y and the torsion angle of the drive member 11Y relative to the driven member 15Y becomes equal to or larger than a predetermined angle θref. The other of the first stopper ST1 and the second stopper ST2 is configured to restrict the relative rotation of the intermediate member 12Y to the driven member 15Y or the relative rotation of the drive member 11Y to the intermediate member 12Y when the input torque into the drive member 11Y reaches the torque T2.

This configuration allows for the deflections of the first and the second springs SP1' and SP2' until one of the first and the second stoppers ST1 an ST2 operates. When one of the first and the second stoppers ST1 and ST2 operates, the deflection of one of the first and the second springs SP1' and SP2' is restricted. When both the first and the second stoppers ST1 and ST2 operate, the deflections of both the first and the second springs SP1' and SP2' are restricted. The damper device 10Y accordingly has the two-step (two-stage) damping characteristics. The first stopper ST1 or the second stopper ST2 corresponding to the torque T2 may be configured such as to restrict the relative rotation of the drive member 11Y to the driven member 15Y.

The damper device 10Y configured as described above provides the similar functions and advantageous effects to those of the damper device 10 described above. In the damper device 10Y, one of the first and the second springs SP1' and SP2' may be arranged on the outer side in the radial direction of the other to be arrayed at intervals in the circumferential direction. More specifically, for example, the plurality of first springs SP1' may be arranged in an outer circumferential-side area in the fluid transmission chamber 9 to be arrayed at intervals in the circumferential direction. The plurality of second springs SP2' may be arranged on the inner side in the radial direction of the plurality of first springs SP1' to be arrayed at intervals in the circumferential direction. In this configuration, the first and the second springs SP1' and SP2' may be arranged to at least partially overlap with each other in the radial direction.

Figure 8:
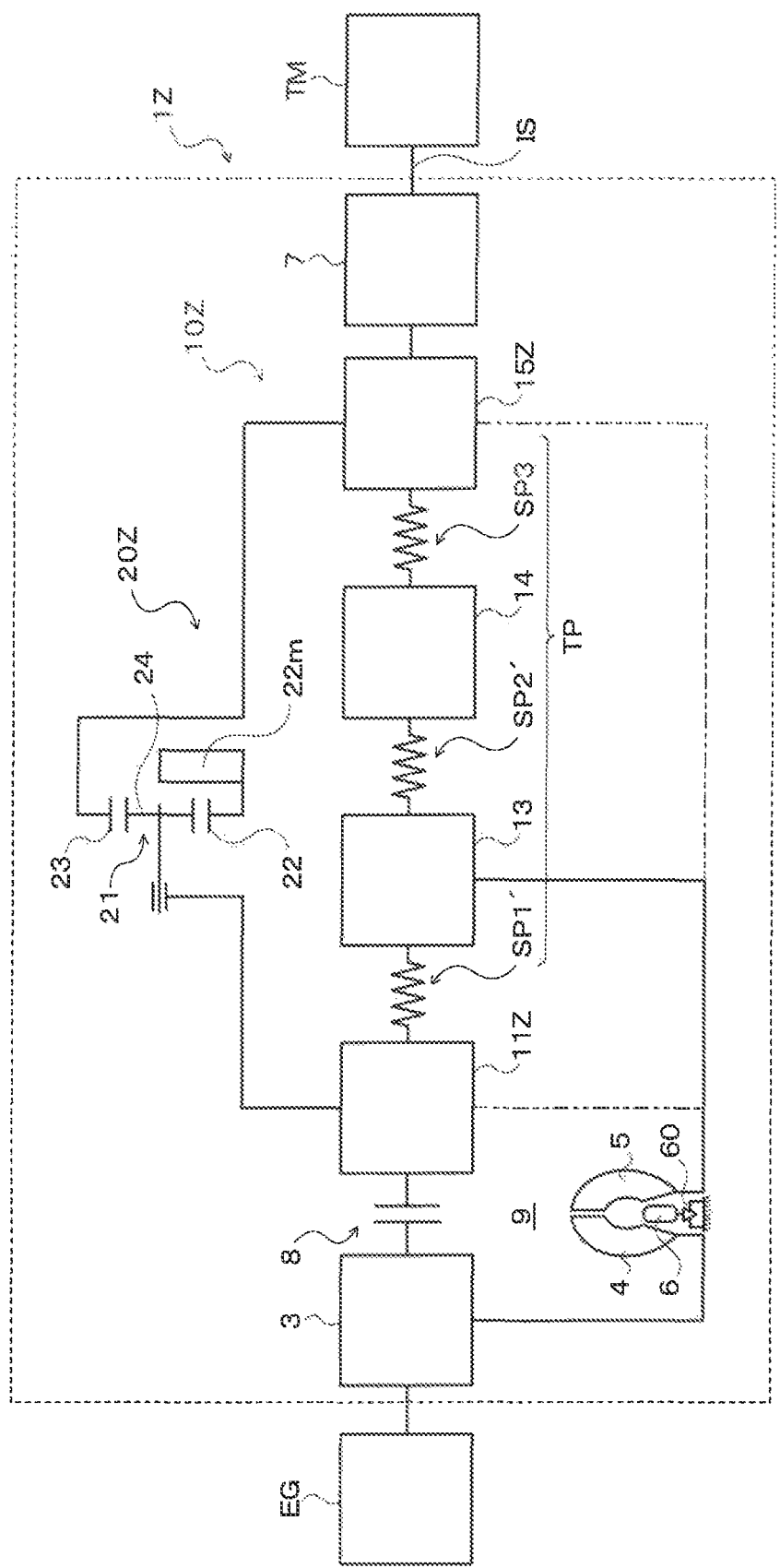
FIG. 8 is a schematic configuration diagram illustrating a starting device according to yet another embodiment of the disclosure.

FIG. 8 is a schematic configuration diagram illustrating a starting device 1Z including a damper device 10Z according to yet another embodiment of the disclosure. Among the components of the starting device 1Z and the damper device 10Z, the same components to those of the starting device 1 and the damper device 10 described above are expressed by the same reference signs and their repeated description is omitted.

The damper device 10Z shown in FIG. 8 includes a drive member (input element) 11Z, a first intermediate member (first intermediate element) 13, a second intermediate member (second intermediate element) 14 and a driven member (output element) 15Z, as rotational elements. Both the first and the second intermediate members 13 and 14 are annular members. A damping ratio 4 of at least one of the first and the second intermediate members 13 and 14 that are vibrated with transmission of the torque from the engine EG to the drive member 11Z is less than the value 1. The damper device 10Z also includes a plurality of first springs (first elastic bodies) SP1' configured to transmit the torque between the drive member 11Z and the first intermediate member 13, a plurality of second springs (second elastic bodies) SP2' configured to transmit the torque between the first intermediate member 13 and the second intermediate member 14, and a plurality of third springs (third elastic bodies) SP3 configured to transmit the torque between the second intermediate member 14 and the driven member 15Z, as torque transmission elements (torque transmission elastic bodies). The plurality of first springs SP1', the first intermediate member 13, the plurality of second springs SP2', the second intermediate member 14 and the plurality of third springs SP3 form a torque transmission path TP between the drive member 11Z and the driven member 15Z. A rotary inertia mass damper 20Z is connected with the drive member 11Z and the driven member 15Z and is arranged in parallel to the torque transmission path TP to mainly transmit an inertia torque to the driven member 15Z. Furthermore, as illustrated, the first intermediate member 13 is coupled with the turbine runner 5 to be integrally rotated.

In the damper device 10Z including the first and the second intermediate members 13 and 14, three resonances occur in the torque transmission path TP when the deflections of all the first to the third springs SP1', SP2' and SP3 are allowed. More specifically, a resonance of the entire damper device 10Z occurs in the torque transmission path TP by the vibrations of the drive member 11Z and the driven member 15Z in the opposite phases when the deflections of the first to the third springs SP1', SP2' and SP3 are allowed. A resonance also occurs in the torque transmission path TP by the vibrations of the first and the second intermediate members 13 and 14 in the opposite phase to both the drive member 11Z and the driven member 15Z when the deflections of the first to the third springs SP1', SP2' and SP3 are allowed. A resonance further occurs in the torque transmission path TP by the vibration of the first intermediate member 13 in the opposite phase to the drive member 11Z, the vibration of the second intermediate member 14 in the opposite phase to the first intermediate member 13 and the vibration of the driven member 15Z in the opposite phase to the second intermediate member 14 when the deflections of the first to the third springs SP1', SP2' and SP3 are allowed. This configuration thus enables a total of three antiresonance points, where the vibration transmitted from the drive member 11Z to the driven member 15Z via the torque transmission path TP and the vibration transmitted from the drive member 11Z to the driven member 15Z via the rotary inertia mass damper 20Z are theoretically cancelled out each other, to be set in the damper device 10Z.

Among the three antiresonance points that are likely to provide theoretically zero vibration amplitude of the driven member 15Z (that are likely to further decrease the vibration amplitude), a first antiresonance point of the lowest rotation speed may be set in the low rotation speed range of 500 rpm to 1500 rpm (in the expected setting range of the lockup rotation speed Nlup). This shifts one resonance having the minimum frequency of the resonances occurring in the torque transmission path TP toward the lower rotation speed (toward the lower frequency), such as to be included in a non-lockup area of the lockup clutch 8. This results in allowing for the lockup at the lower rotation speed and remarkably effectively improving the vibration damping performance of the damper device 10Z in the low rotation speed range that is likely to increase the vibration from the engine EG. The damper device 10Z may make a second antiresonance point of the higher rotation speed (the higher frequency) than the first antiresonance point equal to (closer to), for example, (the frequency) of a resonance point of the input shaft IS of the transmission TM or may make a third antiresonance point of the higher rotation speed (the higher frequency) than the second antiresonance point equal to (closer to), for example, (the frequency) of a resonance point in the damper device 10Z, such as to effectively suppress the occurrence of such resonances. The damper device 10Z may be configured such as to include three or more intermediate members in the torque transmission path TP. The turbine runner 5 may be coupled with the second intermediate member 14 or may be coupled with one of the drive member 11Z and the driven member 15Z as shown by a two-dot chain line in FIG. 8.

Figure 9:
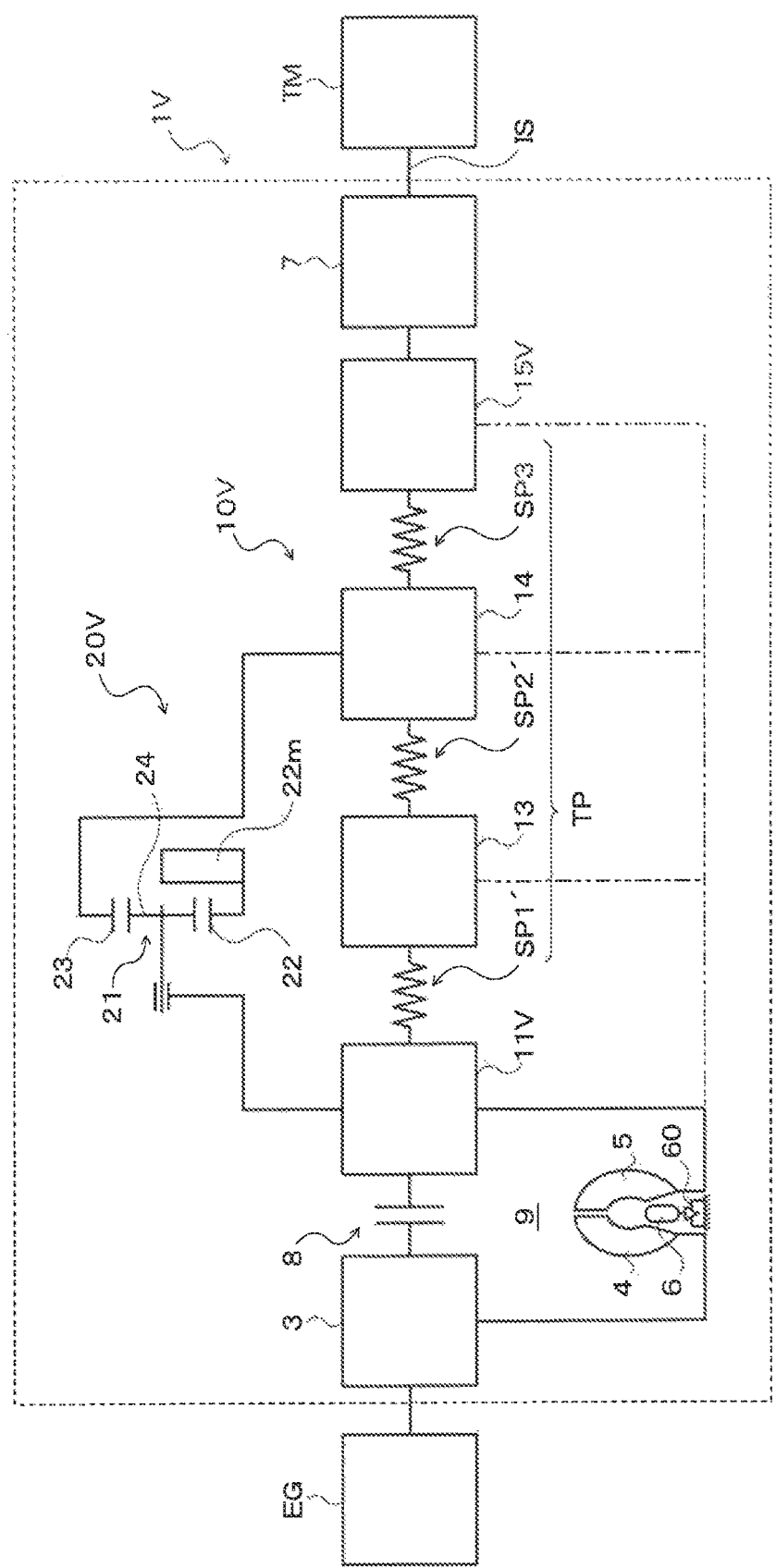
FIG. 9 is a schematic configuration diagram illustrating a starting device according to another embodiment of the disclosure.

FIG. 9 is a schematic configuration diagram illustrating a starting device 1V including a damper device 10V according to another embodiment of the disclosure. Among the components of the starting device 1V and the damper device 10V, the same components to those of the starting device 1 and the damper device 10 described above are expressed by the same reference signs and their repeated description is omitted.

The damper device 10V shown in FIG. 9 includes a drive member (input element) 11V, a first intermediate member (first intermediate element) 13, a second intermediate member (second intermediate element) 14 and a driven member (output element) 15V, as rotational elements. With regard to the first and the second intermediate members 13 and 14 that are vibrated with transmission of the torque from the engine EG to the drive member 11V, at least the first intermediate member 13 is an annular member, and a damping ratio $\zeta$ of at least the first intermediate member 13 is less than the value 1. The damper device 10V also includes a plurality of first springs (first elastic bodies) SP1' configured to transmit the torque between the drive member 11V and the first intermediate member 13, a plurality of second springs (second elastic bodies) SP2' configured to transmit the torque between the first intermediate member 13 and the second intermediate member 14 (driven member 15V), and a plurality of third springs (third elastic bodies) SP3 configured to transmit the torque between the second intermediate member 14 and the driven member 15V, as torque transmission elements (torque transmission elastic bodies). The plurality of first springs SP1', the first intermediate member 13, the plurality of second springs SP2', the second intermediate member 14 and the plurality of third springs SP3 form a torque transmission path TP between the drive member 11V and the driven member 15V. In the illustrated example of FIG. 9, the third springs SP3 are configured to have a larger spring constant (higher rigidity) than the spring constants (rigidities) of the first and the second springs SP1' and SP2'.

A rotary inertia mass damper 20V is connected with the drive member 11V and the second intermediate member 14 and is arranged in parallel to the plurality of first springs (first elastic bodies) SP1', the first intermediate member 13 and the plurality of second springs (second elastic bodies) SP2' of the torque transmission path TP to mainly transmit an inertia torque to the driven member 15V via the second intermediate member 14 and the third springs SP3. Accordingly the drive member 11V serves as a planetary carrier (first element) of a planetary gear 21 that supports a plurality of pinion gears 24 to be rotatable (rotatable on their own axes) and revolvable about a sun gear 22 and a ring gear 23. Additionally, the ring gear (second element) 23 of the planetary gear 21 is fixed to the second intermediate member 14 to be rotatable integrally with the second intermediate member 14. This configuration causes the sun gear 22 and a mass portion 22m as the mass body (third element) to be rotated with relative rotation of the drive member 11V to the driven member 15V or more specifically with relative rotation of the drive member 11V to the second intermediate member 14. In the damper device 10V, the drive member 11V is coupled with the turbine runner 5 to be rotated integrally.

This configuration of the damper device 10V is substantially equivalent to the configuration that the plurality of third springs SP3 working in parallel are placed between the driven member 15Y and the input shaft IS of the transmission TM in the damper device 10Y shown in FIG. 7. In the damper device 10V, the rotary inertia mass damper 20V is provided in parallel to the first and the second springs SP1' and SP2' and the first intermediate member 13. Accordingly, in the damper device 10V, two (multiple) natural frequencies may be set for the torque transmission path from the drive member 11V to the second intermediate member 14 in the state that the deflections of at least the first and the second springs SP1' and SP2' are allowed, and a resonance of the first intermediate member 13 (second resonance) may occur at the higher rotation speed (the higher frequency) than a first resonance. As a result, this enables a total of two antiresonance points that provide theoretically zero vibration amplitude of the driven member 15V to be set in the damper device 10V.

The damper device 10V is especially suitable to be used in combination with a transmission TM for rear-wheel drive. In the transmission TM for rear-wheel drive having a long length from one end of an input shaft IS (starting device 1V-side end) to one end of a non-illustrated output shaft (wheel side-end), the rigidities of the input shaft IS coupled with the driven member 15V of the damper device 10V and of the output shaft (and additionally an intermediate shaft) are decreased. Accordingly the natural frequency (resonance frequency) determined by the moments of inertia of these shaft members is decreased (lowered) by the effect of the moment of inertia of the entire rotary inertia mass damper 20V. This may obviously cause a resonance, which is supposed to occur at the high rotation speed of the drive member 11 (engine EG), even in a low rotation speed range. The configuration that the rotary inertia mass damper 20V is coupled with the drive member 11V and with the second intermediate member 14 of the damper device 10V, on the other hand, causes the third springs SP3 to be placed between the rotary inertia mass damper 20V and the input shaft IS of the transmission TM coupled with the driven member 15V and thereby substantially separates the rotary inertia mass damper 20V from the input shaft IS. This configuration enables two antiresonance points to be set and remarkably effectively reduces the effect of the moment of inertia of the entire rotary inertia mass damper 20V on the natural frequency determined by the moment of inertia of the shaft member coupled with the driven member 15V and so on.

The damper device 10V may, however, be used in combination with a transmission TM for front-wheel device. In the case where the damper device 10V is combined with the transmission TM for front-wheel vehicle, the configuration of the damper device 10V also remarkably effectively reduces the effect of the moment of inertia of the entire rotary inertia mass damper 20V on the natural frequency determined by the moment of inertia of the shaft member coupled with the driven member 15V and so on, and additionally improves the vibration damping performance of the damper device 10V by a further decrease of the rigidity. The damper device 10V may be configured such as to include any additional intermediate member and springs (elastic bodies) between the first intermediate member 13 and the second intermediate member 14. Furthermore, the turbine runner 5 may be coupled with one of the first and the second intermediate members 13 and 14 as shown by a two-dot chain line in FIG. 9 or may be coupled with the driven member 15V. The rotary inertia mass damper 20V may be configured such as to include the turbine runner 5 as the mass body that rotates with relative rotation of the drive member 11 to the driven member 15 (to the second intermediate member 14).

Figure 10:
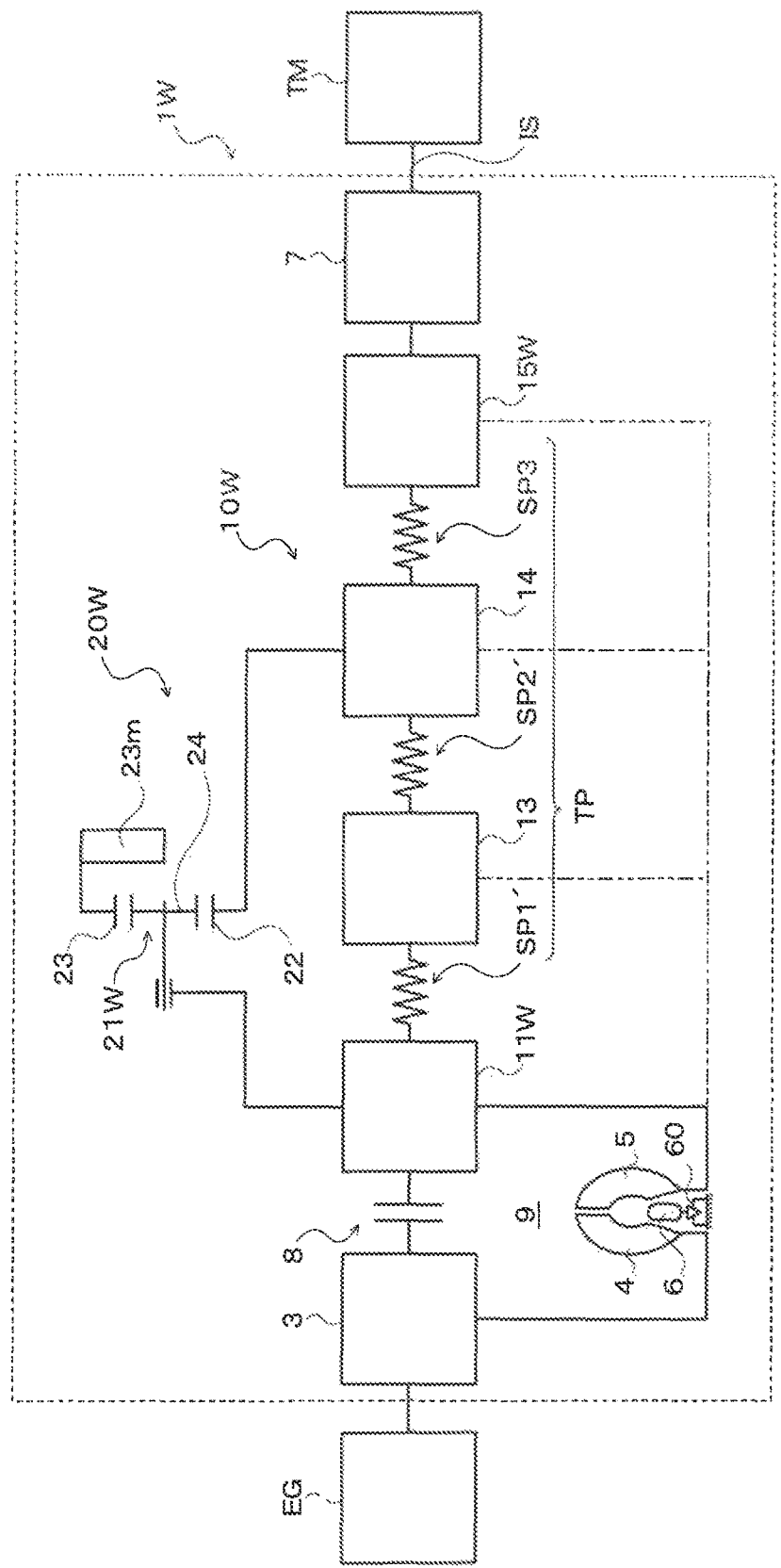
FIG. 10 is a schematic configuration diagram illustrating a starting device according to yet another embodiment of the disclosure.

FIG. 10 is a schematic configuration diagram illustrating a starting device 1W including a damper device 10W according to yet another embodiment of the disclosure. Among the components of the starting device 1W and the damper device 10W, the same components to those of the starting device 1 and the damper device 10 described above are expressed by the same reference signs and their repeated description is omitted.

The damper device 10W shown in FIG. 10 is equivalent to the configuration that the rotary inertia mass damper 20V is replaced with a different rotary inertia mass damper 20W in the damper device 10V described above. The rotary inertia mass damper 20W is connected with a drive member 11W and a second intermediate member 14 and is arranged in parallel to a plurality of first springs (first elastic bodies) SP1', a first intermediate member 13 and a plurality of second springs (second elastic bodies) SP2' of a torque transmission path TP to mainly transmit an inertia torque to the driven member 15W via the second intermediate member 14 and third springs SP3. Accordingly the drive member 11W serves as a planetary carrier (first element) of a planetary gear 21 that supports a plurality of pinion gears 24 to be rotatable (rotatable on their own axes) and revolvable about a sun gear 22 and a ring gear 23. Additionally, the sun gear (second element) 22 of the planetary gear 21 is fixed to the second intermediate member 14 to be rotatable integrally with the second intermediate member 14. This configuration causes the ring gear 23 and a mass portion 23m as the mass body (third element) to be rotated with relative rotation of the drive member 11W to the driven member 15W or more specifically with relative rotation of the drive member 11W to the second intermediate member 14. This damper device 10W provides the similar functions and advantageous effects to those of the damper device 10V described above.

FIGS. 11A, 11B, 11C and 11D are schematic diagrams respectively illustrating rotary inertia mass dampers 20D to 20G that are applicable to the above damper device 10, 10X, 10Y, 10Z, 10V or 10W.

The rotary inertia mass damper 20D shown in FIG. 11A is configured by a double pinion-type planetary gear 21D. The planetary gear 21D includes a sun gear (third element) 22D that is an external gear, a ring gear (first element) 23D that is an internal gear arranged concentrically with the sun gear 22, and a planetary carrier (second element) 25 that is configured to hold multiple sets of two pinion gears 24a and 24b such as to be rotatable (rotatable on their own axes) and revolvable. The two pinion gears 24a and 24b are arranged such that they engage with each other and that one engages with the sun gear 22D and the other engages with the ring gear 23D.

The sun gear 22D of the planetary gear 21D is used as the mass body of the rotary inertia mass damper 20D, includes a mass portion 22m to increase the moment of inertia, and is supported rotatably by a non-illustrated damper hub and so on. The ring gear 23D is coupled with a drive member 11 or a non-illustrated lockup piston to be rotatable integrally with the drive member 11. The planetary carrier 25 is coupled with a driven member 15 to be rotatable integrally with the driven member 15. According to a modification, the plurality of pinion gears 24a and 24b may be supported by the driven member 15. In other words, the driven member 15 itself may be used as the planetary carrier of the planetary gear 21D.

The rotary inertia mass damper 20E shown in FIG. 11B is configured by a planetary gear 21E that includes a plurality of step pinion gears 26, each including a smaller-diameter pinion gear 26a and a larger-diameter pinion gear 26b coaxially and integrally connected with each other. The planetary gear 21E includes, in addition to the plurality of step pinion gears 26, a first sun gear (first element) 27a arranged to engage with the smaller-diameter pinion gear 26a of each step pinion gear 26, a second sun gear (second element) 27b arranged to engage with the larger-diameter pinion gear 26b of each step pinion gear 26, and a planetary carrier (third element) 28 arranged to support the plurality of step pinion gears 26 such as to be rotatable and revolvable.

The number of teeth of the larger-diameter pinion gear 26b of the step pinion gear 26 is determined to be larger than the number of teeth of the smaller-diameter pinion gear 26a. The first sun gear 27a is coupled with a drive member 11 or a non-illustrated lockup piston to be rotatable integrally with the drive member 11. The second sun gear 27b is coupled with a driven member 15 to be rotatable integrally with the driven member 15. The planetary carrier 28 is used as the mass body of the rotary inertia mass damper 20E, includes a mass portion 28m to increase the moment of inertia, and is supported rotatably by, for example, a non-illustrated damper hub and so on.

The rotary inertia mass damper 20F shown in FIG. 11C is configured by a planetary gear 21F that includes a plurality of step pinion gears 26, each including a smaller-diameter pinion gear 26a and a larger-diameter pinion gear 26b coaxially and integrally connected with each other. The planetary gear 21F includes, in addition to the plurality of step pinion gears 26, a first ring gear (first element) 29a arranged to engage with the smaller-diameter pinion gear 26a of each step pinion gear 26, a second ring gear (second element) 29b arranged to engage with the larger-diameter pinion gear 26b of each step pinion gear 26, and a planetary carrier (third element) 28 arranged to support the plurality of step pinion gears 26 such as to be rotatable and revolvable.

The number of teeth of the larger-diameter pinion gear 26b of the step pinion gear 26 is determined to be larger than the number of teeth of the smaller-diameter pinion gear 26a. The first ring gear 29a is coupled with a drive member 11 or a non-illustrated lockup piston to be rotatable integrally with the drive member 11. The second ring gear 29b is coupled with a driven member 15 to be rotatable integrally with the driven member 15. The planetary carrier 28 is used as the mass body of the rotary inertia mass damper 20F, includes a mass portion 28m to increase the moment of inertia, and is supported rotatably by, for example, a non-illustrated damper hub and so on.

The rotary inertia mass damper 20G shown in FIG. 11D is configured by a planetary gear 21G that includes a plurality of step pinion gears 26, each including a smaller-diameter pinion gear 26a and a larger-diameter pinion gear 26b coaxially and integrally connected with each other. The planetary gear 21G includes, in addition to the plurality of step pinion gears 26, a planetary carrier (first element) 28 arranged to support the plurality of step pinion gears 26 such as to be rotatable and revolvable, a sun gear (second element) 27G arranged to engage with the larger-diameter pinion gear 26b of each step pinion gear 26 and a ring gear (third element) 29G arranged to engage with the smaller-diameter pinion gear 26a of each step pinion gear 26.

The number of teeth of the larger-diameter pinion gear 26b of the step pinion gear 26 is determined to be larger than the number of teeth of the smaller-diameter pinion gear 26a. The planetary carrier 28 is coupled with a drive member 11 or a non-illustrated lockup piston to be rotatable integrally with the drive member 11. The sun gear 27G is coupled with a driven member 15 to be rotatable integrally with the driven member 15. The ring gear 29G is used as the mass body of the rotary inertia mass damper 20G, includes a mass portion 29m to increase the moment of inertia, and is supported rotatably by, for example, a non-illustrated damper hub and so on.

As described above, a damper device (10, 10X, 10X', 10Y, 10Z, 10V, 10W) according to one aspect of the disclosure is configured to include an input element (11, 11', 11Y, 11Z, 11V, 11W) to which a torque from an engine (EG) is transmitted and an output element (15, 15', 15Y, 15Z, 15V, 15W). The damper device (10, 10X, 10X', 10Y, 10Z, 10V, 10W) includes: a torque transmission path (TP1, TP) including an intermediate element (12, 12', 13, 14), a first elastic body (SP1, SP1') configured to transmit a torque between the input element (11, 11', 11Y, 11Z, 11V, 11W) and the intermediate element (12, 12' 13), and a second elastic body (SP2, SP2') configured to transmit a torque between the intermediate element (12, 12', 14) and the output element (15, 15', 15Y, 15Z, 15V, 15W); and a rotary inertia mass damper (20, 20X, 20Y, 20Z, 20V, 20W, 20D, 20E, 20F, 20G) configured to include a mass body (5, 22, 22m, 23, 23m, 28, 28m, 29G, 29m) rotating with relative rotation of the input element (11, 11', 11Y, 11Z, 11V, 11W) to the output element (15, 15', 15Y, 15Z, 15V, 15W) and provided between the input element (11, 11', 11Y, 11Z, 11V, 11W) and the output element (15, 15', 15Y, 15Z, 15V, 15W) in parallel to the torque transmission path (TP1, TP). A damping ratio ($\zeta$) of the intermediate element (12, 12', 13, 14) determined based on a moment of inertia ($J_2$) of the intermediate element (12, 12', 13, 14) and rigidities ($k_1$, $k_2$) of the first elastic body (SP1, SP1') and the second elastic body (SP2, SP2') is less than a value 1.

In the damper device of this aspect, the intermediate element, the first elastic body and the second elastic body form the torque transmission path, and the rotary inertia mass damper including the mass body that is rotated with relative rotation of the input element to the output element is provided between the input element and the output element in parallel to the torque transmission path. The damping ratio of the intermediate element determined based on the moment of inertia of the intermediate element and the rigidities of the first and the second elastic bodies is less than the value 1.

In the damper device of this aspect, the torque transmitted from the torque transmission path including the intermediate element and the first and the second elastic bodies to the output element depends on (is proportional to) the displacement of the second elastic body between the intermediate element and the output element. The torque transmitted from the rotary inertia mass damper to the output element, on the other hand, depends on (is proportional to) a difference in angular acceleration between the input element and the output element, i.e., a second order differential equation result of the displacement of the elastic body placed between the input element and the output element. On the assumption that an input torque transmitted to the input element 26 of the damper device is periodically vibrated, the phase of the vibration transmitted from the input element to the output element via the torque transmission path is accordingly shifted by 180 degrees from the phase of the vibration transmitted from the input element to the output element via the rotary inertia mass damper. A plurality of natural frequencies (resonance frequencies) may be set in the torque transmission path including the intermediate element having the damping ratio of less than the value 1, in the state that deflections of the first and the second elastic bodies are allowed. A resonance of the intermediate element may be caused in this torque transmission path when the rotation speed of the input element reaches a rotation speed corresponding to one of the plurality of natural frequencies.

This configuration enables two antiresonance points, where the vibration transmitted from the input element to the output element via the torque transmission path and the vibration transmitted from the input element to the output element via the rotary inertia mass damper are theoretically cancelled out each other, to be set in the damper device of this aspect. This configuration thus remarkably effectively improves the vibration damping performance of the damper device by making the frequencies of the two antiresonance points equal to (closer to) the frequency of the vibration (resonance) to be damped by the damper device. Additionally, in the damper device of this aspect, a resonance of the intermediate element occurs when the rotation speed of the input element becomes higher than a rotation speed corresponding to the frequency of an antiresonance point of the lower rotation speed (lower frequency). The amplitude of the vibration transmitted from the second elastic body to the output element accordingly changes from decreasing to increasing before the rotation speed of the input element reaches a rotation speed corresponding to a relatively lower natural frequency of the intermediate element. Even when the amplitude of the vibration transmitted from the rotary inertia mass damper to the output element is gradually increased with an increase in rotation speed of the input element, this expands an area where the vibration transmitted from the rotary inertia mass damper to the output element cancels out at least part of the vibration transmitted from the second elastic body to the output element. This results in further improving the vibration damping performance of the damper device in a relatively low rotation speed range of the input element.

The intermediate element (12, 12', 13) may be an annular member. This configuration provides a relatively low natural frequency of the intermediate element and enables the amplitude of the vibration transmitted to the output element via the second elastic body to be changed from decreasing to increasing at a relatively early timing.

The rotation speed corresponding to the natural frequency of the intermediate element (12, 12', 13) may be higher than a minimum rotation speed (Nlup) in a rotation speed range where a torque is transmitted from the input element (11, 11', 11Y, 11Z, 11V, 11W) to the output element (15, 15', 15Y, 15Z, 15V, 15W) via the torque transmission path (TP1, TP). The amplitude of the vibration transmitted to the output element (15, 15', 15Y, 15Z, 15V, 15W) via the second elastic body (SP2, SP2') may change from decreasing to increasing before the rotation speed of the input element (11, 11', 11Y, 11Z, 11V, 11W) that is equal to or higher than the minimum rotation speed (Nlup) reaches the rotation speed corresponding to the natural frequency of the intermediate element (12, 12', 13).

Additionally, the rotary inertia mass damper (20, 20X, 20Y, 20Z, 20D, 20E, 20F, 20G) may include a differential (21, 21D, 21E, 21F 21G) including a first element (80, 11, 11Y, 11Z, 23D, 27a, 28, 29a) arranged to rotate integrally with the input element, a second element (23, 25, 27b, 27G 29b) arranged to rotate integrally with the output element (15, 15Y, 15Z) and a third element (22, 22D, 28, 29G) arranged to integrally with the mass body (22, 22m, 5, 28m, 29m). This configuration can thus increase the rotation speed of the third element, i.e., the mass body, to be higher than the rotation speed of the input element or decrease the rotation speed of the third element to be lower than the rotation speed of the input element, according to, for example, the magnitude of the moment of inertia of the mass body. This results in enhancing the flexibility in design of the mass body and the entire damper device, while effectively ensuring the moment of inertia applied from the rotary inertia mass damper to the output element. Depending on the magnitude of the moment of inertia of the mass body, the rotary inertia mass damper may be a constant speed rotation mechanism configured to rotate the mass body at the same speed as that of the input element or may include a speed change mechanism configured to change the rotation speed of the mass body according to the relative rotation speed of the input element to output element.

The differential may be a planetary gear (21, 21W, 21D, 21E, 21F, 21G). The differential is, however, not limited to the planetary gear but may be configured such as to, for example, include a link mechanism and so on.

Moreover, the torque transmission path (TP) may include a first intermediate element (13) and a second intermediate element (14) as the intermediate element and may further include a third elastic body (SP3). The first elastic body (SP1') may be arranged to transmit a torque between the input element (11Z) and the first intermediate element (13). The second elastic body (SP2') may be arranged to transmit a torque between the first intermediate element (13) and the second intermediate element (14). The third elastic body (SP3) may be arranged to transmit a torque between the second intermediate element (14) and the output element (15Z). The first and the second intermediate elements (13, 14) may be annular members. The damping ratio ($\zeta$) of at least one of the first and the second intermediate elements (13, 14) may be less than the value 1. The damper device of this configuration can set a total of three antiresonance points, where the vibration transmitted from the input element to the output element via the torque transmission path and the vibration transmitted from the input element to the output element via the rotary inertia mass damper are theoretically cancelled out each other and thereby further improve the vibration damping performance.

The intermediate element (12, 12', 13, 14) may be coupled with a turbine runner (5) of a fluid transmission device to be rotated integrally. This configuration substantially increases the moment of inertia of the intermediate element and shifts an antiresonance point having a minimum frequency to the lower frequency.

Additionally, the mass body of the rotary inertia mass damper (20X) may be configured to include a turbine runner (5) of a fluid transmission device. This configuration further increases the moment of inertia of the mass body of the rotary inertia mass damper and further increases the moment of inertia applied from the rotary inertia mass damper to the output element, while suppressing overall size expansion of the damper device, compared with a configuration equipped with a dedicated mass body.

The first elastic body (SP1, SP1') may have a spring constant that is identical with a spring constant of the second elastic body (SP2, SP2').

The first elastic body (SP1, SP1') may have a spring constant that is different from a spring constant of the second elastic body (SP2, SP2'). This further increases an interval between the two antiresonance points and thereby further improves the vibration damping effect of the damper device in a low frequency range (low rotation speed range).

The spring constants of the first and the second elastic bodies and the moments of inertia of the intermediate element and the mass body may be determined, based on a minimum frequency among antiresonance points that provide zero vibration amplitude of the output element.

The spring constants of the first and the second elastic bodies and the moments of inertia of the intermediate element and the mass body may be determined, based on the minimum frequency of the antiresonance point and the number of cylinders of the engine.

The damper device may be configured to satisfy 500 rpm$\leq$(120/n)·$fa_1$$\leq$1500 rpm, where "$fa_1$" denotes the minimum frequency of the antiresonance point and "n" denotes the number of cylinders of the engine.

Setting the antiresonance point that is likely to further decrease the vibration amplitude of the output element in the low rotation speed range of 500 rpm to 1500 rpm allows for coupling of the engine with the input element at the lower rotation speed and further improves the vibration damping effect of the damper device in a low rotation speed range where the vibration from the engine is likely to be increased. Configuration of the damper device such that the frequency of a resonance (R1) occurring in the torque transmission path is minimized to a minimum possible value that is lower than the frequency $fa_1$ of the antiresonance point further reduces the frequency $fa_1$ of the antiresonance point and allows for coupling of an internal combustion engine with the input element at the further lower rotation speed.

The damper device may be configured to satisfy Nlup≤ (120/n)·$fa_1$, where "Nlup" denotes a lockup rotation speed of a lockup clutch arranged to couple the engine with the input element. This configuration enables the vibration from an internal combustion engine to be remarkably effectively damped by the damper device during coupling of the internal combustion engine with the input element by the lockup clutch or immediately after such coupling.

The damper device may be configured to satisfy 900 rpm≤(120/n)·$fa_1$≤1200 rpm.

The differential may be a planetary gear, and the minimum frequency $fa_1$ of the antiresonance point may be expressed by Equation (8) given above. When the rotary inertia mass damper is configured by a non-single pinion-type planetary gear, "$\gamma=\lambda 2/(1+\lambda)$" in Equation (8), and the constant λ may be determined according to the connection configuration of rotational elements of the planetary gear with the input element and the output element and the gear ratio of the planetary gear.

The damper device may be configured not to restrict deflections of the first and the second elastic bodies until an input torque transmitted to the input element becomes equal to or larger than a predetermined threshold value. In this aspect, the threshold value may be a torque value corresponding to a maximum torsion angle of the damper device or a smaller torque value.

The output element may be operably coupled with an input shaft of a transmission.

The damper device (10V, 10W) configured to include an input element (11V, 11W) to which a torque from an engine (EG) is transmitted and an output element (15V, 15W). The damper device includes a torque transmission path (TP) including first and second intermediate elements (13, 14), a first elastic body (SP1') configured to transmit a torque between the input element (11V, 11W) and the first intermediate element (13), a second elastic body (SP2') configured to transmit a torque between the first intermediate element (13) and the second intermediate element (14), and a third elastic body (SP3) configured to transmit a torque between the second intermediate element (14) and the output element (15V, 15W), and a rotary inertia mass damper (20V, 20W) configured to include a mass body (22, 22m, 23, 23m) rotating with relative rotation of the input element (11V, 11W) to the second intermediate element (14) and provided in parallel to the first elastic body (SP1'), the first intermediate element (13) and the second elastic body (SP1') of the torque transmission path (TP). A damping ratio of the first intermediate element (13) determined based on at least a moment of inertia of the first intermediate element (13) and rigidities of the first and the second elastic bodies (SP1', SP2') is less than a value 1.

In the damper device of this aspect, the rotary inertia mass damper is coupled with the input element and the second intermediate element of the damper device. This configuration causes the third elastic body to be placed between the rotary inertia mass damper and a member coupled with the output element and thereby substantially separates the rotary inertia mass damper from the member. This enables two antiresonance points to be set and remarkably effectively reduces the effect of the moment of inertia of the entire rotary inertia mass damper on the natural frequency determined by the moment of inertia of the member coupled with the output element. Even when the member coupled with the output element of the damper device has a low rigidity and the natural frequency (resonance frequency) determined by the moment of inertia of the member is decreased by the effect of the moment of inertia of the entire rotary inertia mass damper, this results in effectively suppressing a resonance which is supposed to occur at the high rotation speed of the input element from being obviously caused even in a low rotation range.

The rotary inertia mass damper may configured to include a planetary gear that includes a first element arranged to rotate integrally with the input element, a second element arranged to rotate integrally with the second intermediate element and a third element arranged to rotate integrally with the mass body.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The present disclosure is applicable to, for example, the field of manufacture of the damper device.

The invention claimed is:

1. A damper device configured to include an input element to which a torque from an engine is transmitted and an output element, the damper device comprising:
a torque transmission path including an intermediate element, a first elastic body configured to transmit a torque between the input element and the intermediate element, and a second elastic body configured to transmit a torque between the intermediate element and the output element; and
a rotary inertia mass damper configured to include a mass body rotating with relative rotation of the input element to the output element and provided between the input element and the output element in parallel to the torque transmission path, wherein
a damping ratio of the intermediate element determined based on a moment of inertia of the intermediate element and rigidities of the first and the second elastic bodies is less than a value 1.

2. The damper device according to claim 1,
wherein the intermediate element is an annular member.

3. The damper device according to claim 1,
wherein a rotation speed corresponding to a natural frequency of the intermediate element is higher than a minimum rotation speed in a rotation speed range where a torque is transmitted from the input element to the output element via the torque transmission path, and wherein an amplitude of a vibration transmitted to the output element via the second elastic body changes from decreasing to increasing before a rotation speed of the input element that is equal to or higher than the minimum rotation speed reaches the rotation speed corresponding to the natural frequency of the intermediate element.

4. The damper device according to claim 1,
wherein the rotary inertia mass damper configured to include a differential including a first element arranged to rotate integrally with the input element, a second element arranged to rotate integrally with the output element and a third element arranged to rotate integrally with the mass body.

5. The damper device according to claim 4,
wherein the differential is a planetary gear.

6. The damper device according to claim 4,
wherein the torque transmission path includes a first intermediate element and a second intermediate element as the intermediate element and further includes a third elastic body, wherein the first elastic body is arranged to transmit a torque between the input element and the first intermediate element, the second elastic body is arranged to transmit a torque between the first intermediate element and the second intermediate element, and the third elastic body is arranged to transmit a torque between the second intermediate element and the output element, wherein the first intermediate element and the second intermediate element are annular members, and wherein the damping ratio of at least one of the first intermediate element and the second intermediate element is less than the value 1.

7. The damper device according to claim 1,
wherein the intermediate element is coupled with a turbine runner of a fluid transmission device to be integrally rotated.

8. The damper device according to claim 1,
wherein the mass body of the rotary inertia mass damper is configured to include a turbine runner of a fluid transmission device.

9. The damper device according to claim 1,
wherein the first elastic body has a spring constant that is identical with a spring constant of the second elastic body.

10. The damper device according to claim 1,
wherein the first elastic body has a spring constant that is different from a spring constant of the second elastic body.

11. The damper device according to claim 1,
wherein spring constant of the first and the second elastic bodies and moment of inertia of the intermediate element and the mass body are determined, based on a minimum frequency of frequencies of antiresonance points that provide zero vibration amplitude of the output element.

12. The damper device according to claim 11,
wherein the spring constant of the first and the second elastic bodies and the moment of inertia of the intermediate element and the mass body are determined, based on the minimum frequency of the antiresonance point and number of cylinders of the engine.

13. The damper device according to claim 12,
wherein the damper device is configured to satisfy 500 rpm $\leq (120/n) \cdot fa_1 \leq 1500$ rpm, where $fa_1$ denotes the minimum frequency of the antiresonance point and n denotes the number of cylinders of the engine.

14. The damper device according to claim 12,
wherein the damper device is configured to satisfy $Nlup \leq (120/n) \cdot fa_1$, where Nlup denotes a lockup rotation speed of a lockup clutch arranged to couple the engine with the input element.

15. The damper device according to claim 13,
wherein the damper device is configured to satisfy 900 rpm $\leq (120/n) \cdot fa_1 \leq 1200$ rpm.

16. The damper device according to claim 11,
wherein the differential is a planetary gear, and wherein the minimum frequency $fa_1$ of the antiresonance point is expressed by Equation (1):

[Math. 1]

$$fa_1 = \frac{1}{2\pi} \sqrt{\frac{(k_1 + k_2) - \sqrt{(k_1 + k_2)^2 - 4 \cdot \frac{J_2}{J_i} \cdot \gamma \cdot k_1 \cdot k_2}}{2 \cdot J_2}} \quad (1)$$

where $k_1$ denotes the spring constant of the first elastic body, $k_2$ denotes the spring constant of the second elastic body, $J_2$ denotes the moment of inertia of the intermediate element, $J_i$ denotes the moment of inertia of the mass body, and $\gamma$ denotes a constant determined according to a connection configuration of rotational elements of the planetary gear with the input element and the output element, and a gear ratio of the planetary gear.

17. The damper device according to claim 1,
wherein the damper device is configured not to restrict deflections of the first and the second elastic bodies until an input torque transmitted to the input element becomes equal to or larger than a predetermined threshold value.

18. The damper device according to claim 1,
wherein the output element is operably coupled with an input shaft of a transmission.

19. A damper device configured to include an input element to which a torque from an engine is transmitted and an output element, the damper device comprising:
a torque transmission path including first and second intermediate elements, a first elastic body configured to transmit a torque between the input element and the first intermediate element, a second elastic body configured to transmit a torque between the first intermediate element and the second intermediate element, and a third elastic body configured to transmit a torque between the second intermediate element and the output element; and
a rotary inertia mass damper configured to include a mass body rotating with relative rotation of the input element to the second intermediate element and provided in parallel to the first elastic body, the first intermediate element and the second elastic body of the torque transmission path, wherein
a damping ratio of the first intermediate element determined based on at least a moment of inertia of the first intermediate element and rigidities of the first and the second elastic bodies is less than a value 1.

20. The damper device according to claim 19,
wherein the rotary inertia mass damper is configured to include a planetary gear that includes a first element arranged to rotate integrally with the input element, a second element arranged to rotate integrally with the second intermediate element and a third element arranged to rotate integrally with the mass body.

* * * * *